(12) United States Patent
Mori et al.

(10) Patent No.: US 11,812,173 B2
(45) Date of Patent: Nov. 7, 2023

(54) IMAGING APPARATUS AND DISTANCE INFORMATION CALCULATION METHOD

(71) Applicant: NUVOTON TECHNOLOGY CORPORATION JAPAN, Kyoto (JP)

(72) Inventors: Keiichi Mori, Osaka (JP); Junichi Matsuo, Osaka (JP); Mitsuhiko Otani, Osaka (JP); Mayu Ogawa, Osaka (JP)

(73) Assignee: NUVOTON TECHNOLOGY CORPORATION JAPAN, Kyoto (JP)

( * ) Notice: Subject to any disclaimer, the term of this patent is extended or adjusted under 35 U.S.C. 154(b) by 316 days.

(21) Appl. No.: 17/399,888

(22) Filed: Aug. 11, 2021

(65) Prior Publication Data

US 2021/0377478 A1 Dec. 2, 2021

Related U.S. Application Data

(63) Continuation of application No. PCT/JP2020/005184, filed on Feb. 10, 2020.

(30) Foreign Application Priority Data

Feb. 15, 2019 (JP) .................................. 2019-026055

(51) Int. Cl.
  *H04N 25/75* (2023.01)
  *G01S 7/4863* (2020.01)
  (Continued)

(52) U.S. Cl.
  CPC .......... *H04N 25/75* (2023.01); *G01S 7/4863* (2013.01); *G01S 7/4865* (2013.01); *H04N 25/705* (2023.01)

(58) Field of Classification Search
  CPC .... H04N 25/75; H04N 25/705; H04N 25/703; G01S 7/4863; G01S 7/4865; G01S 7/4876; G01S 17/10; G01S 17/89; G01C 3/06

See application file for complete search history.

(56) References Cited

U.S. PATENT DOCUMENTS

2006/0114333 A1* 6/2006 Gokturk .................. G01S 17/10
                                                     348/222.1
2015/0092019 A1* 4/2015 Asano ..................... H04N 23/74
                                                      348/136

(Continued)

FOREIGN PATENT DOCUMENTS

JP          4369574 B2     11/2009

OTHER PUBLICATIONS

International Search Report and Writen Opinion dated Apr. 21, 2020 in International Application No. PCT/JP2020/005184; with partial English translation.

*Primary Examiner* — Albert H Cutler
(74) *Attorney, Agent, or Firm* — McDermott Will & Emery LLP

(57) ABSTRACT

An imaging apparatus includes a light emitter, a pixel section, and a signal processor which calculates distance information of a subject. The pixel section includes a photoelectric converter, first and second read-out gates, and a plurality of charge accumulators including a first charge accumulator and a second charge accumulator. The first read-out gate is activated in a first period and deactivated in a second period. The second read-out gate is activated in the first period and the second period. The signal processor calculates the distance information based on a total amount of signal charges accumulated in the charge accumulators in the first period and the second period and a difference between an amount of signal charges accumulated in the second charge accumulator in the first period and the second period and an amount of the signal charge accumulated in the first charge accumulator in the first period.

9 Claims, 22 Drawing Sheets

(51) Int. Cl.
 *G01S 7/4865* (2020.01)
 *H04N 25/705* (2023.01)

(56) References Cited

U.S. PATENT DOCUMENTS

| | | | |
|---|---|---|---|
| 2017/0074976 A1* | 3/2017 | Takahashi | G01C 3/085 |
| 2018/0156898 A1* | 6/2018 | Suzuki | H04N 25/771 |
| 2019/0007592 A1* | 1/2019 | Otani | G01S 17/89 |

* cited by examiner

IMAGING APPARATUS AND DISTANCE INFORMATION CALCULATION METHOD

CROSS REFERENCE TO RELATED APPLICATIONS

This is a continuation application of PCT International Application No. PCT/JP2020/005184 filed on Feb. 10, 2020, designating the United States of America, which is based on and claims priority of Japanese Patent Application No. 2019-026055 filed on Feb. 15, 2019. The entire disclosures of the above-identified applications, including the specifications, drawings and claims are incorporated herein by reference in their entirety.

FIELD

The present disclosure relates to an imaging apparatus which obtains distance information of a subject.

BACKGROUND

Imaging apparatuses which measure distances by a time of flight (TOF) method are known in the related art (see PTL 1, for example).

CITATION LIST

Patent Literature

PTL 1: Japanese Patent No. 4369574

SUMMARY

Technical Problem

In distance measurement by a TOF method, a relatively short distance to the subject results in a relatively large amount of signal charges generated by photoelectric conversion of reflected light reflected from the subject. This may lead to saturation of the charge accumulator which accumulates the signal charges in some cases.

Thus, an object of the present disclosure is to provide an imaging apparatus which enables suppression in saturation of the charge accumulator.

Solution to Problem

The imaging apparatus according to one aspect of the present disclosure includes: a light emitter which emits pulsed light to a subject; a solid-state imaging device including a pixel section disposed on a semiconductor substrate; and a signal processor which calculates distance information concerning a distance to the subject. The pixel section includes: a photoelectric converter which converts received light to a signal charge; a first read-out gate and a second read-out gate which read out signal charges from the photoelectric converter; and a plurality of charge accumulators which includes a first charge accumulator and a second charge accumulator which are paired with the first read-out gate and the second read-out gate, respectively, and accumulates the signal charges read out by the first read-out gate and the second read-out gate. The first read-out gate is activated in a first period which starts before emission of the pulsed light by the light emitter is stopped, and is deactivated in a second period subsequent to the first period, a time interval between the start of the first period and an end of the second period is longer than an emission period of the pulsed light, the second read-out gate is activated in the first period and the second period, the first charge accumulator accumulates the signal charge read out by the first read-out gate activated in the first period, the second charge accumulator accumulates the signal charge read out by the second read-out gate activated in the first period and the second period, and when the photoelectric converter receives light, the signal processor calculates the distance information based on: a total amount of the signal charges accumulated in the plurality of charge accumulators in the first period and the second period; and a difference between an amount of the signal charge accumulated in the second charge accumulator in the first period and the second period and an amount of the signal charge accumulated in the first charge accumulator in the first period.

The distance information calculation method according to one aspect of the present disclosure is a distance information calculation method which is performed by an imaging apparatus including: a light emitter which emits pulsed light to a subject; a solid-state imaging device including a pixel section disposed on a semiconductor substrate; and a signal processor which calculates distance information concerning a distance to the subject, the pixel section including a photoelectric converter which converts received light to a signal charge, a first read-out gate and a second read-out gate which read out signal charges from the photoelectric converter, a plurality of charge accumulators which includes a first charge accumulator and a second charge accumulator which are paired with the first read-out gate and the second read-out gate, respectively, and accumulates the signal charges read out by the first read-out gate and the second read-out gate. The distance information calculation method includes: activating the first read-out gate in a first period which starts before emission of the pulsed light by the light emitter is stopped, and deactivating the first read-out gate in a second period subsequent to the first period, where a time interval between the start of the first period and an end of the second period is longer than an emission period of the pulsed light; activating the second read-out gate in the first period and the second period; accumulating the signal charge read out by the first read-out gate which is activated, in the first charge accumulator in the first period; accumulating the signal charge read out by the second read-out gate which is activated, in the second charge accumulator in the first period and the second period; and calculating the distance information based on: a total amount of the signal charges accumulated in the plurality of charge accumulators in the first period and the second period, and a difference between an amount of the signal charge accumulated in the second charge accumulator in the first period and the second period and an amount of the signal charge accumulated in the first charge accumulator in the first period when the photoelectric converter receives light.

Advantageous Effects

An imaging apparatus which enables suppression in saturation of the charge accumulator is provided.

BRIEF DESCRIPTION OF DRAWINGS

These and other advantages and features will become apparent from the following description thereof taken in conjunction with the accompanying Drawings, by way of non-limiting examples of embodiments disclosed herein.

DESCRIPTION OF EMBODIMENTS

Figure 1:
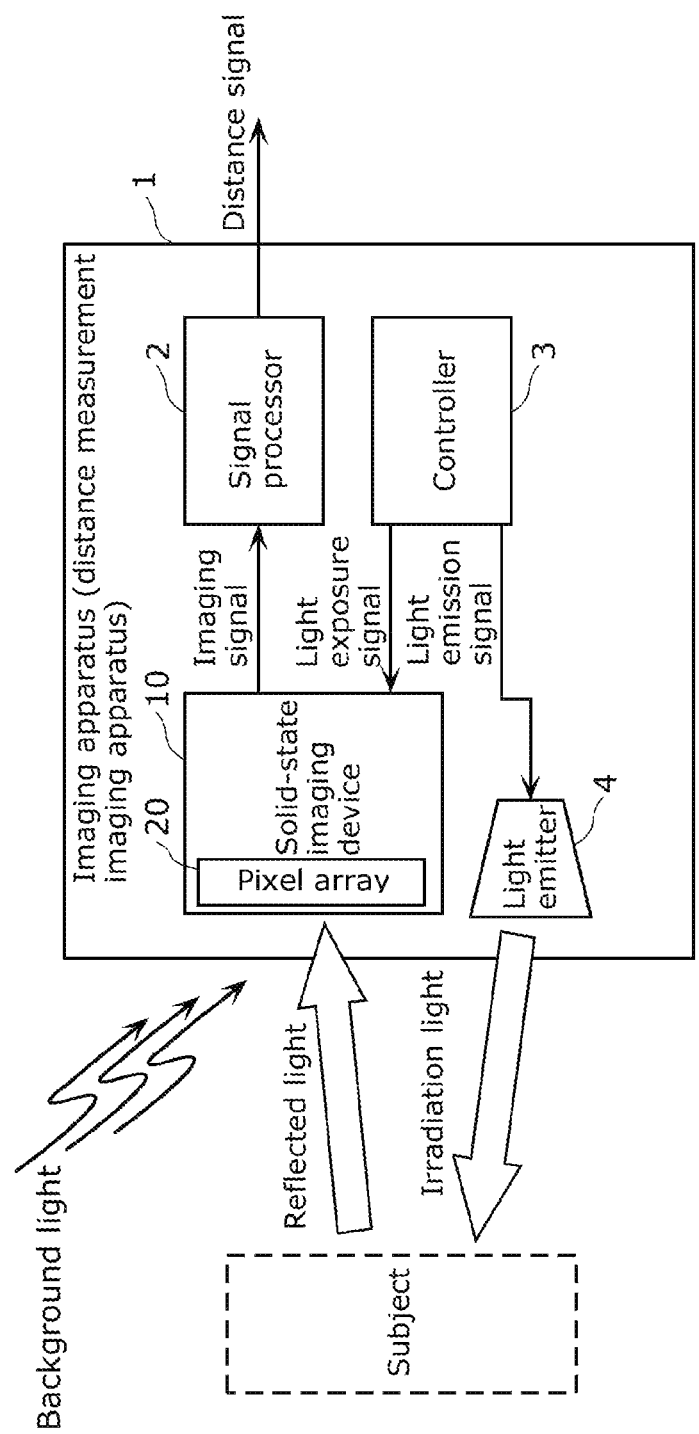
FIG. 1 is a block diagram illustrating an example of the configuration of the imaging apparatus according to Embodiment 1.

The imaging apparatus according to one aspect of the present disclosure includes: a light emitter which emits pulsed light to a subject; a solid-state imaging device including a pixel section disposed on a semiconductor substrate; and a signal processor which calculates distance information concerning a distance to the subject. The pixel section includes: a photoelectric converter which converts received light to a signal charge; a first read-out gate and a second read-out gate which read out signal charges from the photoelectric converter; and a plurality of charge accumulators which includes a first charge accumulator and a second charge accumulator which are paired with the first read-out gate and the second read-out gate, respectively, and accumulates the signal charges read out by the first read-out gate and the second read-out gate. The first read-out gate is activated in a first period which starts before emission of the pulsed light by the light emitter is stopped, and is deactivated in a second period subsequent to the first period, a time interval between the start of the first period and an end of the second period is longer than an emission period of the pulsed light, the second read-out gate is activated in the first period and the second period, the first charge accumulator accumulates the signal charge read out by the first read-out gate activated in the first period, the second charge accumulator accumulates the signal charge read out by the second read-out gate activated in the first period and the second period, and when the photoelectric converter receives light, the signal processor calculates the distance information based on: a total amount of the signal charges accumulated in the plurality of charge accumulators in the first period and the second period; and a difference between an amount of the signal charge accumulated in the second charge accumulator in the first period and the second period and an amount of the signal charge accumulated in the first charge accumulator in the first period.

In the imaging apparatus having such a configuration, the signal charge generated through photoelectric conversion of the reflected light of the pulsed light emitted from the light emitter and reflected from the subject is distributed to and accumulated in the first charge accumulator and the second charge accumulator. For this reason, the imaging apparatus having the above configuration can suppress the saturation of the charge accumulator.

Moreover, a timing for starting activation of the first read-out gate may be identical to a timing for starting activation of the second read-out gate.

Moreover, the timing for starting activation of the first read-out gate may be earlier than the timing for starting activation of the second read-out gate.

Moreover, the solid-state imaging device may include pixel sections arranged in a matrix to constitute a pixel array, each of the pixel sections being the pixel section. In all of the pixel sections, the first read-out gates and the second read-out gates may be disposed in identical relative positions with respect to the photoelectric converter, and timings of activation and deactivation of the first read-out gate may be identical, and timings of activation and deactivation of the second read-out gate may be identical.

Moreover, in a first reflected light non-reception period in which the photoelectric converter does not receive reflected light of the pulsed light emitted from the light emitter, the first read-out gate may further be activated in a third period having a time interval identical to a time interval of the first period, and may further be deactivated in a fourth period which is subsequent to the third period and has a time interval identical to a time interval of the second period. In the first reflected light non-reception period, the second read-out gate may further be activated in the third period and the fourth period, the first charge accumulator may further accumulate the signal charge read out by the first read-out gate which is activated, in the third period. The second charge accumulator may further accumulate the signal charge read out by the second read-out gate which is activated, in the third period and the fourth period. The signal processor may calculate the distance information based on an amount of the signal charge accumulated in the first charge accumulator in the third period and an amount of the signal charge accumulated in the second charge accumulator in the third period and the fourth period.

Moreover, the pixel section may further include a signal exchanger for use in exchanging the signal charge accumulated in the first charge accumulator and the signal charge accumulated in the second charge accumulator between the first charge accumulator and the second charge accumulator. The light emitter may further reemit the pulsed light to the subject after exchanging the signal charge accumulated in the first charge accumulator and the signal charge accumulated in the second charge accumulator using the signal exchanger. The second read-out gate may further be activated in a fifth period where a phase difference in the fifth period with respect to reemission of the pulsed light by the light emitter is equal to a phase difference in the first period with respect to emission of the pulsed light by the light emitter, and may further be deactivated in a sixth period where the phase difference in the sixth period with respect to reemission of the pulsed light by the light emitter is equal to a phase difference in the second period with respect to emission of the pulsed light by the light emitter. The first read-out gate may further be activated in the fifth period and the sixth period. The first charge accumulator may further accumulate the signal charge read out by the first read-out gate which is activated, in the fifth period and the sixth period. The second charge accumulator may further accumulate the signal charge read out by the second read-out gate which is activated, in the fifth period. When the photoelectric converter further receives light, the signal processor may calculate the distance information based on a total amount of the signal charges accumulated in the plurality of charge accumulators in the first period, the second period, the fifth period, and the sixth period, and a difference between a total amount of the signal charges accumulated in the second charge accumulator in the first period and the second period and the signal charges accumulated in the first charge accumulator in the fifth period and the sixth period and a total amount of the signal charge accumulated in the first charge accumulator in the first period and the signal charge accumulated in the second charge accumulator in the fifth period.

Moreover, in a second reflected light non-reception period in which the photoelectric converter does not receive reflected light of the pulsed light reemitted from the light emitter, the second read-out gate may further be activated in a seventh period having a time interval identical to a time interval of the fifth period, and may further be deactivated in an eighth period which is subsequent to the seventh period and has a time interval identical to a time interval of the sixth period. In the second reflected light non-reception period, the first read-out gate may further be activated in the seventh period and the eighth period, the first charge accumulator may further accumulate the signal charge read out by the first read-out gate which is activated, in the seventh period and the eighth period. The second charge accumulator may further accumulate the signal charge read out by the second read-out gate which is activated, in the seventh period. The signal processor may calculate the distance information based on an amount of the signal charges accumulated in the first charge accumulator in the seventh period and the eighth period and an amount of the signal charge accumulated in the second charge accumulator in the seventh period.

Moreover, the plurality of charge accumulators may further include a third charge accumulator and a fourth charge accumulator which are paired with the first read-out gate and the second read-out gate, respectively.

The distance information calculation method according to one aspect of the present disclosure is a distance information calculation method which is performed by an imaging apparatus including: a light emitter which emits pulsed light to a subject; a solid-state imaging device including a pixel section disposed on a semiconductor substrate; and a signal processor which calculates distance information concerning a distance to the subject, the pixel section including a photoelectric converter which converts received light to a signal charge, a first read-out gate and a second read-out gate which read out signal charges from the photoelectric converter, a plurality of charge accumulators which includes a first charge accumulator and a second charge accumulator which are paired with the first read-out gate and the second read-out gate, respectively, and accumulates the signal charges read out by the first read-out gate and the second read-out gate. The distance information calculation method includes: activating the first read-out gate in a first period which starts before emission of the pulsed light by the light emitter is stopped, and deactivating the first read-out gate in a second period subsequent to the first period, where a time interval between the start of the first period and an end of the second period is longer than an emission period of the pulsed light; activating the second read-out gate in the first period and the second period; accumulating the signal charge read out by the first read-out gate which is activated, in the first charge accumulator in the first period; accumulating the signal charge read out by the second read-out gate which is activated, in the second charge accumulator in the first period and the second period; and calculating the distance information based on: a total amount of the signal charges accumulated in the plurality of charge accumulators in the first period and the second period, and a difference between an amount of the signal charge accumulated in the second charge accumulator in the first period and the second period and an amount of the signal charge accumulated in the first charge accumulator in the first period when the photoelectric converter receives light.

In the distance information calculation method having such a configuration, the signal charge generated through photoelectric conversion of the reflected light of the pulsed light emitted from light emitter and reflected from the subject is distributed to and accumulated in the first charge accumulator and the second charge accumulator. For this reason, the imaging apparatus having the above configuration can suppress saturation of the charge accumulator.

Specific examples of the imaging apparatus according to one aspect of the present disclosure will now be described with reference to the drawings. The embodiments shown here are all illustrations of specific examples of the present disclosure. Accordingly, numeric values, shapes, components, arrangements of the components, connections forms thereof, and the like shown in the embodiments below are exemplary and should not be construed as limitations to the present disclosure. The drawings are schematic views, and are not always strictly illustrated.

Embodiment 1

Figure 2:
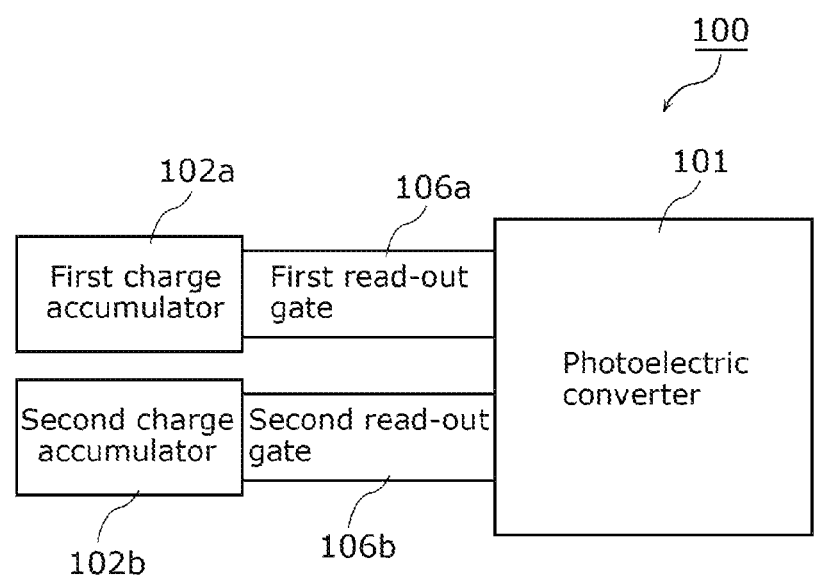
FIG. 2 is a block diagram illustrating a schematic configuration of the pixel section according to Embodiment 1.

The imaging apparatus according to Embodiment 1 will now be described. The imaging apparatus measures a distance by a TOF method using the round trip time of flight of light to a subject. Here, first, the basic principle of the distance measurement performed by the imaging apparatus according to Embodiment 1 will be described, and then a specific configuration of the imaging apparatus according to Embodiment 1 will be described. The imaging apparatus according to Embodiment 1 is also referred to as distance measurement imaging apparatus in some cases because it measures the distance to a subject. 1. Basic Principle FIG. 1 is a block diagram illustrating an example of the configuration of imaging apparatus 1 according to Embodiment 1. FIG. 2 is a block diagram illustrating a schematic configuration of pixel section 100 included in imaging apparatus 1.

As illustrated in FIG. 1, imaging apparatus 1 includes light emitter 4, solid-state imaging device 10, signal processor 2, and controller 3.

Controller 3 outputs a light emission signal to instruct irradiation of a subject with light, and a light exposure signal to instruct exposure to background light attributed to reflected light from the subject and sunlight. For example, controller 3 is implemented by a memory and a processor which executes programs stored in the memory.

Light emitter 4 includes a light emitting element, and emits pulsed light to the subject according to the light emission signal output from controller 3. The light emitting element is implemented by a laser diode, a vertical cavity surface emitting laser (VCSEL), or a light emitting diode (LED), for example. The irradiation light is infrared light, for example.

Solid-state imaging apparatus 10 includes pixel array 20 including pixel sections 100 arranged in a matrix (see FIG. 2). For example, solid-state imaging device 10 is implemented by a CMOS image sensor.

Pixel array 20 receives reflected light of the pulsed light emitted from light emitter 4 and reflected from the subject. Pixel array 20 also receives background light attributed to sunlight or the like. Pixel array 20 is exposed to light according to the light exposure signal output from controller 3. Although pixel array 20 including pixel sections 100 arranged in a matrix will be described below, pixel array 20 can have any other configuration than the configuration where pixel sections 100 arranged in a matrix is included, as long as at least one pixel section 100 is included. For example, pixel array 20 may include one pixel section 100.

Pixel section 100 is disposed above a semiconductor substrate. As illustrated in FIG. 2, pixel section 100 includes photoelectric converter 101, first read-out gate 106a, second read-out gate 106b, first charge accumulator 102a, and second charge accumulator 102b.

Photoelectric converter 101 converts the received light to a signal charge. For example, photoelectric converter 101 is implemented by a photodiode.

First read-out gate 106a and second read-out gate 106b read out signal charges from photoelectric converter 101. First read-out gate 106a and second read-out gate 106b are in one of the activated state, i.e., an electrically conducted state and a deactivated state, i.e., an electrically unconducted state. First read-out gate 106a and second read-out gate 106b perform the signal charge reading-out in the activated state, and do not perform the signal charge reading-out in the deactivated state. First read-out gate 106a and second read-out gate 106b are individually controlled between the electrically conducted state and the electrically unconducted state according to the light exposure signal output from controller 3.

First charge accumulator 102a and second charge accumulator 102b are charge accumulators which are paired with first read-out gate 106a and second read-out gate 106b to accumulate signal charges read out by first read-out gate 106a and second read-out gate 106b, respectively. The description will be performed here, for convenience, where first charge accumulator 102a accumulates a signal charge read out by first read-out gate 106a and second charge accumulator 102b accumulates a signal charge read out by second read-out gate 106b.

Returning to FIG. 1, the description of the configuration of imaging apparatus 1 will be continued.

Signal processor 2 calculates distance information concerning the distance to the subject based on the signal charge accumulated in first charge accumulator 102a and signal charge accumulated in second charge accumulator 102b. For example, signal processor 2 is implemented by a memory and a processor which executes programs stored in the memory.

Although signal processor 2 and controller 3 have been described here as external components of solid-state imaging device 10, part or all of the functions implemented by signal processor 2 may be implemented by solid-state imaging device 10, or part or all of the functions implemented by controller 3 may be implemented by solid-state imaging device 10.

Figure 3:
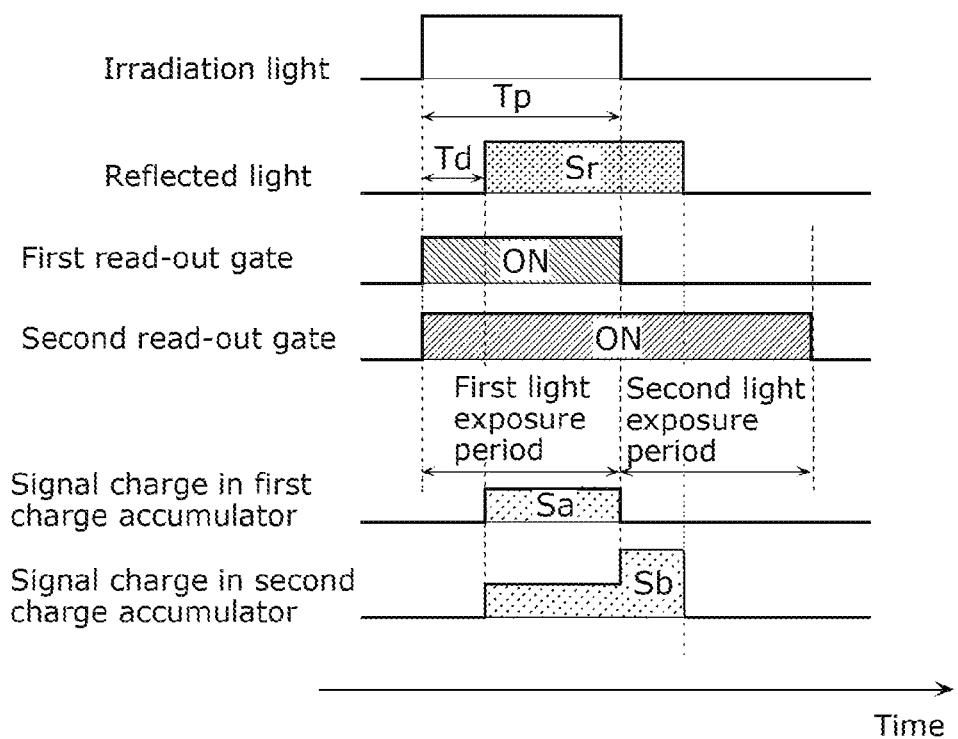
FIG. 3 is a timing chart illustrating an outline (basic principle) of measurement of a distance performed by the imaging apparatus according to Embodiment 1.

FIG. 3 is a timing chart illustrating the outline (basic principle) of the distance measurement performed by imaging apparatus 1 having the above configuration.

The pulsed irradiation light having time width Tp, which is emitted from light emitter 4 in response to an instruction by controller 3, reaches pixel section 100 as reflected light reflected from the subject with a delay of time Td from the light emission timing of the irradiation light.

The relation between time Td and distance D is represented by the following expression:

$$D = c \times Td/2 \qquad \text{(Expression 0)}$$

where the distance to the subject is defined as D and the speed of light (299,792,458 m/s) is defined as c.

Controller 3 controls a first light exposure period (also referred to as "first period") in which first read-out gate 106a and second read-out gate 106b are activated and a second light exposure period (also referred to as "second period") in which only second read-out gate 106b is activated, the second period being subsequent to the first light exposure period. Here, the first light exposure period is defined as a period from the start of light emission by light emitter 4 to the end thereof. The second light exposure period is defined as a period from the end of the light emission by light emitter to passing of another time Tp. Here, assume that the signal charge reading-out ability of first read-out gate 106a is equal to that of second read-out gate 106b.

As shown by "Signal charge in first charge accumulator" and "Signal charge in second charge accumulator" in FIG. 3, halves of the charge amount of the charge generated in photoelectric converter 101 in the first light exposure period in which first read-out gate 106a and second read-out gate 106b are both in the activated state are distributed and transferred to first charge accumulator 102a and second charge accumulator 102b, respectively. The charge generated in photoelectric converter 101 in the second light exposure period in which only second read-out gate 106b is in the activated state is totally transferred to second charge accumulator 102b.

In such an operation for the pulsed irradiation light at one time, where the signal charge generated from the total pulsed reflected light in photoelectric converter 101 is defined as Sr, the signal charge accumulated in first charge accumulator 102a is defined as Sa, and the signal charge accumulated in second charge accumulator 102b is defined as Sb, the sum of signal charge Sa and signal charge Sb corresponds to signal charge Sr, and the difference between signal charge Sa and signal charge Sb corresponds to the signal charge (hereinafter, referred to as Sd) corresponding to the reflected light which reaches pixel section 100 in the second light exposure period.

Because the ratio of time Td to time Tp is equal to the ratio of signal charge Sd to signal charge Sr, signal processor 2 can calculate the distance D to the subject from the following expression:

$$D = c \times Tp/2 \times (Sd/Sr) \quad \text{(Expression 1)}$$

$$D = c \times Tp/2 \times (Sb-Sa)/(Sb+Sa) \quad \text{(Expression 2)}$$

A specific configuration of imaging apparatus 1 which performs the distance measurement according to the outline (basic principle) will now be described.

2. Specific Configuration

Figure 4:
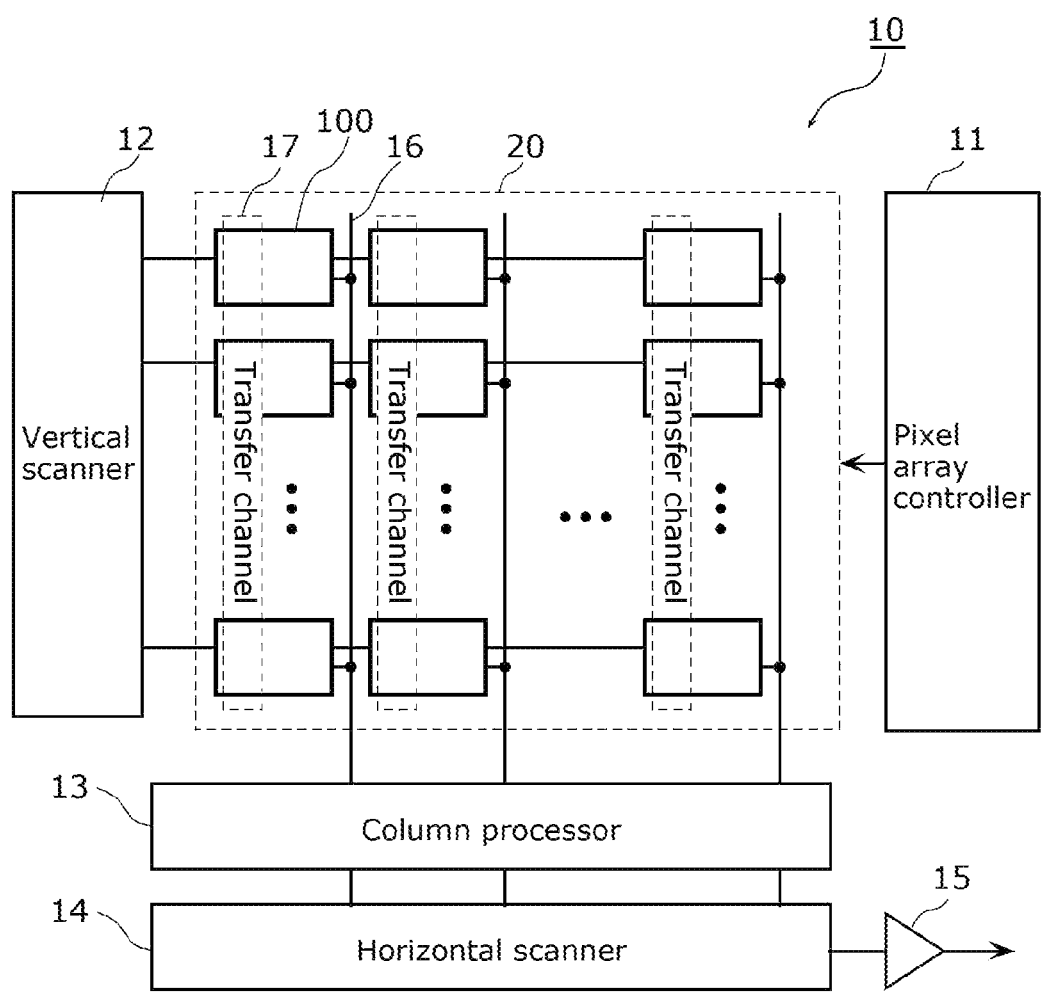
FIG. 4 is a block diagram illustrating an example of the configuration of the solid-state imaging device according to Embodiment 1.

FIG. 4 is a block diagram illustrating an example of the configuration of solid-state imaging device 10 according to Embodiment 1.

As illustrated in FIG. 4, solid-state imaging device 10 includes pixel array 20, pixel array controller 11, vertical scanner 12, column processor 13, horizontal scanner 14, and output buffer 15.

Pixel array 20 includes pixel sections 100 arranged in a matrix, and a plurality of vertical signal lines 16 disposed in corresponding columns. Here, pixel sections 100 included in pixel array 20 are arranged in a matrix such that first read-out gates 106a and second read-out gates 106b are disposed in identical relative positions with respect to photoelectric converter 101 in all of pixel sections 100.

Pixel array 20 includes transfer channel 17 formed for each column by linearly connecting transfer channels 104 (described later) in the column direction, transfer channels 104 being included in each of pixel sections 100 aligned in the column direction. Pixel array controller 11 controls pixel sections 100 included in pixel array 20, based on the light exposure signal output from controller 3. Here, pixel array controller 11 controls pixel sections 100 such that the timings of activation and deactivation of first read-out gates 106a are identical and the timings of activation and deactivation of second read-out gates 106b are identical in all of pixel sections 100 included in pixel array 20.

Vertical scanner 12 scans the signal charges read out by pixel sections 100 included in pixel array 20 in row unit. In other words, vertical scanner 12 sequentially selects the rows one by one, and outputs the signal charges to the corresponding one of vertical signal lines 16 disposed for the respective columns.

Column processor 13 receives the signal charges output to vertical signal lines 16, and performs correlated double sampling (CDS) to output their corresponding pixel signals.

Horizontal scanner 14 scans the pixel signals output from column processor 13, namely, sequentially selects and outputs the pixel signals one by one. In some cases, column processor 13 may include an A/D conversion circuit which converts the pixel signal to digital signal for each column of vertical signal line 16.

Output buffer 15 outputs the pixel signals received from horizontal scanner 14.

Figure 5:
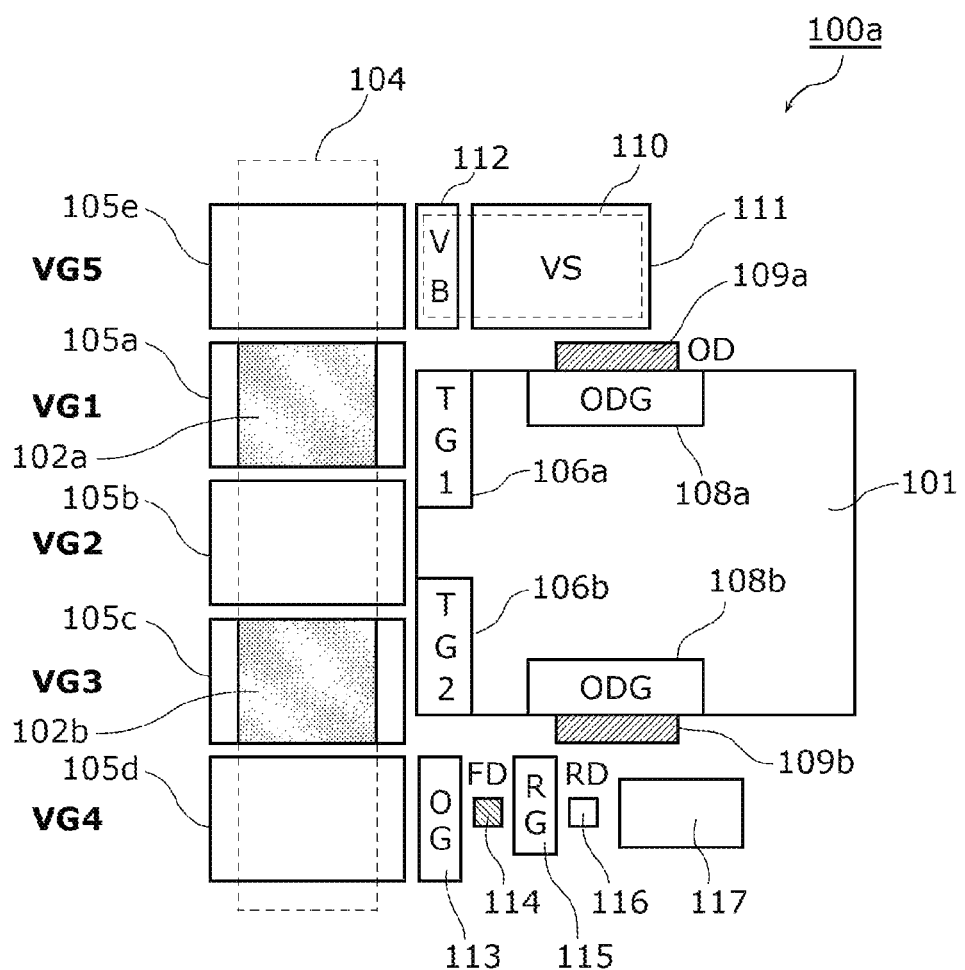
FIG. 5 is a block diagram illustrating an example of the configuration of the pixel section according to Embodiment 1.

FIG. 5 is a schematic view illustrating an example of the configuration of pixel section 100.

As illustrated in FIG. 5, pixel section 100 includes photoelectric converter 101, a plurality of charge accumulators 102 (as one example, first charge accumulator 102a and second charge accumulator 102b), a plurality of read-out gates 106 (as one example, first read-out gate 106a and second read-out gate 106b), output control gate 113, floating diffusion layer 114, reset gate 115, reset drain 116, read-out circuit 117, a plurality of light exposure control gates 108 (as one example, light exposure control gate 108a and light exposure control gate 108b), a plurality of overflow drains 109 (as one example, overflow drain 109a and overflow drain 109b), and signal exchanger 110.

Photoelectric converter 101 converts the received light to a signal charge.

Read-out gate 106 reads out the signal charge from photoelectric converter 101.

Charge accumulator 102 accumulates the signal charge read out by read-out gate 106. Charge accumulator 102 includes transfer channel 104 (CCD channel 104) for transferring the signal charge disposed under a gate insulating film and transfer electrode 105 (as one example, any one of transfer electrodes 105a, 105b, 105c, 105d, and 105e) disposed above the gate insulating film. In other words, as illustrated in FIG. 5, charge accumulator 102 includes part of transfer channel 104 and part of transfer electrode 105 which overlaps part of transfer channel 104 in a planar view of the semiconductor substrate. As illustrated in FIG. 5, one transfer channel 104 is disposed per pixel section 100. As described above, in pixel array 20, transfer channels 104 for pixel sections 100 aligned in the column direction are linearly connected one another in the column direction. Thereby, transfer channel 17 is formed for each column of pixel array 20.

In the present embodiment, the voltages applied to transfer electrodes 105a, 105b, 105c, 105d, and 105e are defined as VG1, VG2, VG3, VG4, and VG5, respectively.

First charge accumulator 102a and second charge accumulator 102b perform 5-phase drive. When high voltages VG1 and VG3 are applied by pixel array controller 11, first charge accumulator 102a and second charge accumulator 102b are formed adjacent to first read-out gate 106a and second read-out gate 106b, respectively, below transfer electrode 105 in the depth direction thereof (here, below transfer electrode 105a and transfer electrode 105c in the depth directions thereof).

Overflow drain 109 discharges the signal charge from photoelectric converter 101.

Light exposure control gate 108 controls the discharge of the signal charge to overflow drain 109.

Signal exchanger 110 receives a transfer of the signal charge to be accumulated in charge accumulator 102 from one of the plurality of charge accumulators 102 (here, first charge accumulator 102a and second charge accumulator 102b), retains the signal charge, and transfers a signal charge already retained to one of the plurality of charge accumulators 102 (here, first charge accumulator 102a and second charge accumulator 102b). Signal exchanger 110 includes charge retention gate 111, and transfer control gate 112 which controls transfer by signal exchanger 110. As described later, signal exchanger 110 is used to exchange the signal charge accumulated in one charge accumulator (here, first charge accumulator 102a or second charge accumulator 102b) of the plurality of charge accumulators 102 and the signal charge accumulated in the other charge accumulator (here, second charge accumulator 102b or first charge accumulator 102a) of the plurality of charge accumulators 102 between the one charge accumulator (here, first charge accumulator 102a or second charge accumulator 102b) and the other charge accumulator (here, second charge accumulator 102b or first charge accumulator 102a).

Floating diffusion layer 114 receives the transfer of the signal charge to be accumulated in charge accumulator 102 from one of the plurality of charge accumulators 102 (here, first charge accumulator 102a and second charge accumulator 102b).

Output control gate 113 controls the transfer to floating diffusion layer 114.

Read-out circuit 117 converts the signal charge retained in floating diffusion layer 114 to a voltage, and reads out the voltage from pixel section 100 to vertical signal line 16. For example, read-out circuit 117 includes a source follower transistor including a gate connected to floating diffusion layer 114, and a selection transistor connected to the source follower transistor in series. For example, after the selection transistor selects read-out circuit 117, the signal charge retained in floating diffusion layer 114 is converted to a voltage signal by read-out circuit 117, and is read out to vertical signal line 16.

Pixel array controller 11 applies drive pulse ODG to light exposure control gate 108a and light exposure control gate 108b, drive pulses TG1 and TG2 to first read-out gate 106a and second read-out gate 106b, and drive pulses VG1 to VG5 to transfer electrodes 105a to 105e. During light exposure, a high voltage is applied to electrodes corresponding to VG1 and VG3, and a low voltage is applied to other electrodes. Thereby, the charge can be accumulated under transfer electrode 105 to which a high voltage is applied. In other words, charge accumulators 102 (here, first charge accumulator 102a and second charge accumulator 102b) are formed by transfer electrodes 105 to which a high voltage is applied (here, transfer electrode 105a and transfer electrode 105c) and transfer channel 104 underlying and overlapping the electrodes.

In the initial state, ODG is in a high state, and photoelectric converter 101 is reset. First read-out gate 106a and second read-out gate 106b are in a low state. First charge accumulator 102a and second charge accumulator 102b including transfer electrode 105a and transfer electrode 105c retained in the high state are electrically shielded from photoelectric converter 101. In this state, the signal charge generated in photoelectric converter 101 is discharged to overflow drain 109 through light exposure control gate 108.

The operation performed by imaging apparatus 1 will now be described with reference to the drawings.

Figure 6:
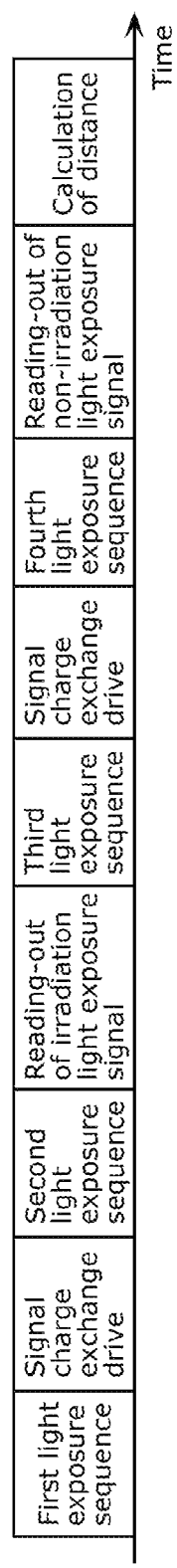
FIG. 6 is an operation sequence diagram of the operation performed by the imaging apparatus according to Embodiment 1.

FIG. 6 is an operation sequence diagram illustrating the operation performed by imaging apparatus 1.

As illustrated in FIG. 6, imaging apparatus 1 performs the steps included in a first light exposure sequence, signal charge exchange drive, a second light exposure sequence, reading-out of an irradiation light exposure signal, a third light exposure sequence, signal charge exchange drive, a fourth light exposure sequence, reading-out of a non-irradiation light exposure signal, and calculation of the distance in this order.

First, the first light exposure sequence will be described.

Figure 7:
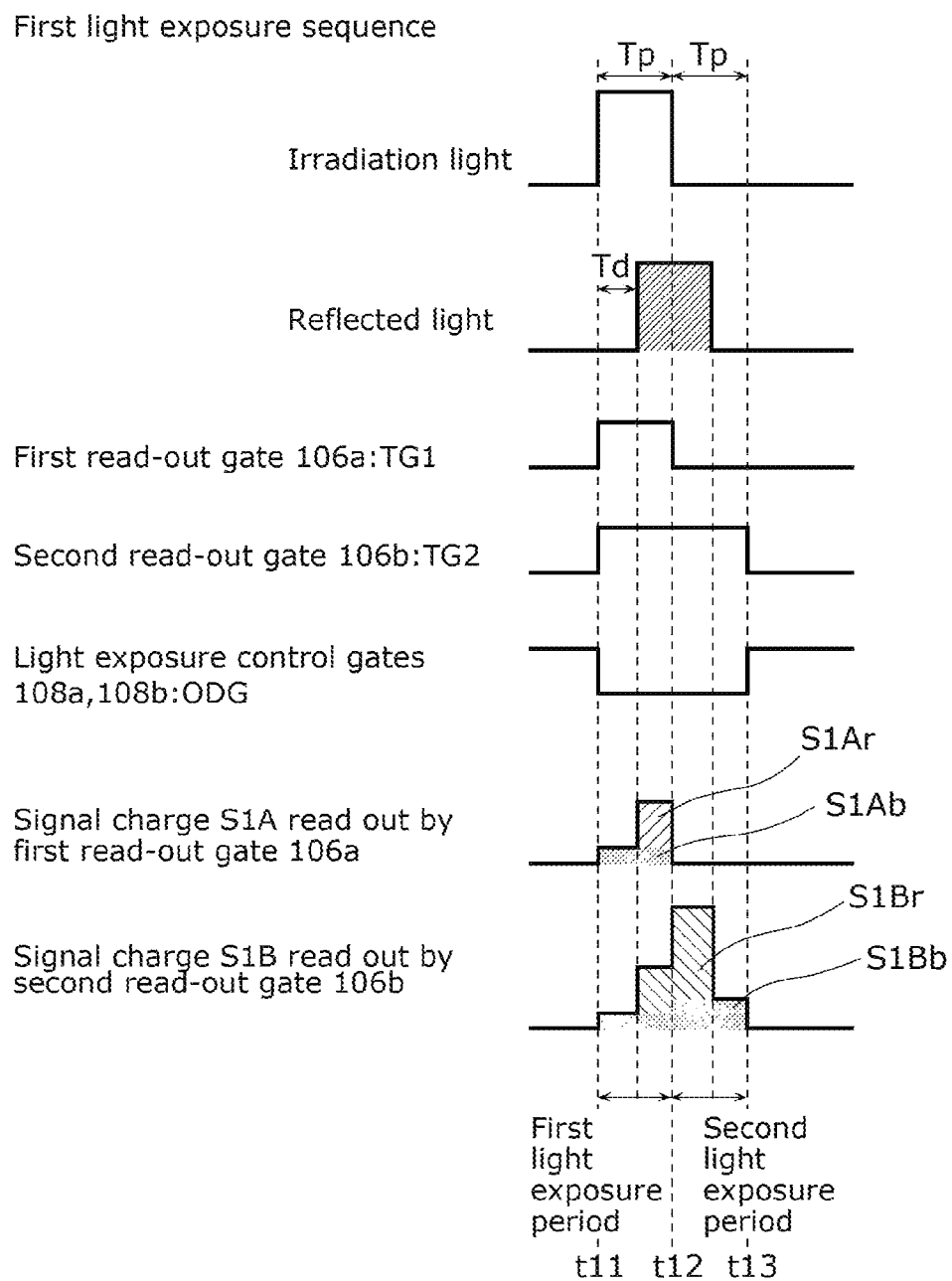
FIG. 7 is a timing chart of a first light exposure sequence according to Embodiment 1.

FIG. 7 is a timing chart of the first light exposure sequence illustrating the light emission timing of light emitter 4, the light emission and signal accumulation timing in pixel section 100, and the light exposure states of the signal charges accumulated in charge accumulators 102 through first read-out gate 106a and second read-out gate 106b.

The first light exposure sequence includes a first light exposure period (also referred to as "first period") synchronizing with time Tp from the start of irradiation to the end of irradiation with pulsed light emitted from light emitter 4 having a timing controlled by controller 3, and a second light exposure period (also referred to as "second period") until time Tp passes from the end of irradiation with the pulsed light. As illustrated in FIG. 7, the first period starts before the irradiation with the pulsed light by light emitter 4 stops. The second period is a period subsequent to the first light exposure period. In this period, the time interval between the start of the first light exposure period and the end of the second period is longer than emission period Tp of the pulsed light.

After the first light exposure sequence starts, the pulsed light having an interval of time Tp is emitted from light emitter 4 according to an instruction by controller 3. The reflected light of the emitted pulsed light reflected from the subject reaches pixel section 100 after a delay of time Td according to the distance from imaging apparatus 1, and is converted to a signal charge in photoelectric converter 101.

According to an instruction by controller 3, pixel array controller 11 transits ODG from the high state (activated state) to the low state (deactivated state) synchronizing with time t11 at which the first light exposure period starts, and concurrently transits first read-out gate 106a and second read-out gate 106b from the low state (deactivated state) to the high state (activated state).

By the operation of pixel array controller 11, discharge of the signal charge from photoelectric converter 101 to overflow drain 109 is stopped, and the signal charge generated in photoelectric converter 101 by receiving an early arriving component of the reflected light of the pulsed light emitted from light emitter 4 which reaches photoelectric converter 101 in the first light exposure period and by receiving the background light other than the reflected light reaching there in the first light exposure period is accumulated in first charge accumulator 102a through first read-out gate 106a and in second charge accumulator 102b through second read-out gate 106b.

Next, in the second light exposure period, according to an instruction by controller 3, pixel array controller 11 transits first read-out gate 106a from the high state (activated state) to the low state (deactivated state) at time t12 (timing of the start). Thereby, the accumulation of the signal charge in first charge accumulator 102a is stopped.

By the control operation described above, the signal charge generated in photoelectric converter 101 by receiving a lately arriving component of the reflected light which reaches photoelectric converter 101 after time t12 in the second light exposure period and by receiving the background light which reaches photoelectric converter 101 in the second light exposure period is totally accumulated in second charge accumulator 102b through second read-out gate 106b.

At time t13, which is the end of the second light exposure period, according to an instruction by controller 3, pixel array controller 11 stops the accumulation of the signal charge in second charge accumulator 102b by transiting second read-out gate 106b from the high state (activated state) to the low state (deactivated state), and converts light exposure control gate 108 to an electrically conducted state by transiting ODG from the low state (deactivated state) to the high state (activated state). Thereby, photoelectric converter 101 is reset.

At the end of the first light exposure sequence, the relations represented by the following expressions are established:

$$A0 = S1A \quad \text{(Expression 3)}$$

$$A1 = S1B \quad \text{(Expression 4)}$$

where the signal charge accumulated in charge accumulator 102 through first read-out gate 106a is defined as S1A, the signal charge accumulated in charge accumulator 102 through second read-out gate 106b is defined as S1B, the signal charge accumulated in first charge accumulator 102a is defined as A0, and the signal charge accumulated in second charge accumulator 102b is defined as A1.

Furthermore, signal charge S1A is made of signal charge S1Ar generated in photoelectric converter 101 by receiving the pulsed reflected light and signal charge S1Ab generated in photoelectric converter 101 by receiving the background light other than the pulsed reflected light, and signal charge S1B is made of signal charge S1Br generated in photoelectric converter 101 by receiving the pulsed reflected light and signal charge S1Bb generated in photoelectric converter 101 by receiving the background light other than the pulsed reflected light. Thus, the relations represented by the following expressions are established:

$$A0 = S1Ar + S1Ab \quad \text{(Expression 5)}$$

$$A1 = S1Br + S1Bb \quad \text{(Expression 6)}$$

As described above, in the first light exposure sequence, the charge is concurrently transferred to two charge accumulators 102, i.e., first charge accumulator 102a and second charge accumulator 102b in the first light exposure period, and about a half of the charge amount of the signal charge generated in photoelectric converter 101 in the first light exposure period is accumulated in their corresponding charge accumulators 102. Thus, signal saturation in charge accumulator 102 is suppressed.

Furthermore, there is a fundamental phenomenon as follows: The intensity of the reflected light is proportional to distance D to the subject by $1/D^2$. Thus, a subject located in a short distance has smaller delay time Td of the reflected light, resulting in a larger proportion of the early arriving component of the reflected light included in the first light exposure period. In the present disclosure, about a half of the signal charge generated in photoelectric converter 101 from the early arriving component of the reflected light, which is included in the first light exposure period and has an intensity increased by the subject located in a shorter distance, is distributed to and accumulated in charge accumulators 102. For this reason, it is shown that the control of light emission and light exposure in the first light exposure sequence provides a high effect of suppressing the signal saturation in charge accumulator 102 for the subject located in a short distance.

To be noted, a difference in charge transfer properties between first read-out gate 106a and second read-out gate 106b caused by a variation in properties in the semiconductor production process may lead to a possibility that the amount of the signal charge accumulated in first charge accumulator 102a in the first light exposure period and that of the signal charge accumulated in second charge accumulator 102b in the first light exposure period are not exactly 50% of the charge amount of the signal charge generated in photoelectric converter 101 in the first light exposure period.

Next, the signal charge exchange drive will be described.

Figure 8:
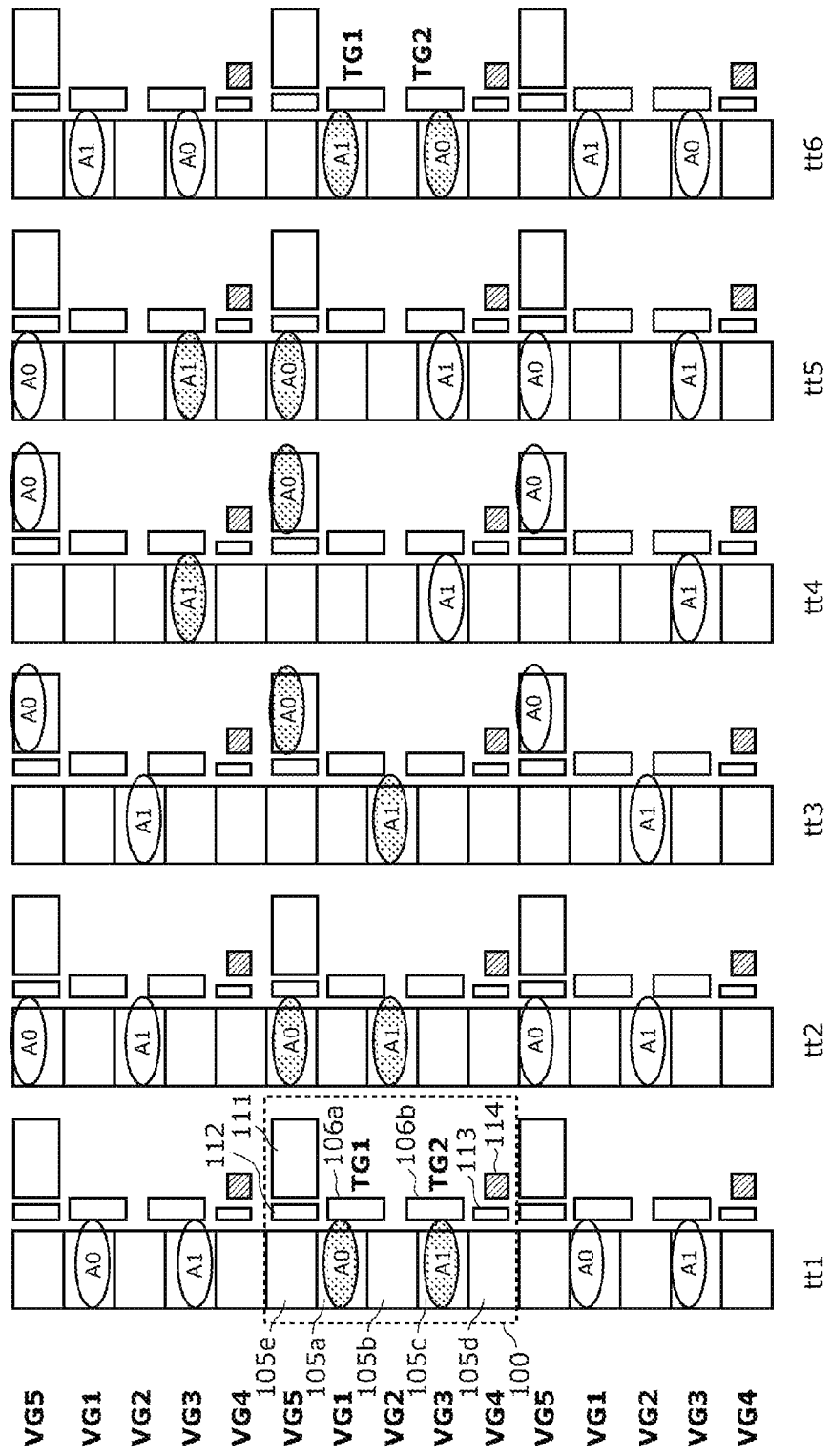
FIG. 8 is a schematic plan view illustrating how the operation of the signal charge exchange drive according to Embodiment 1 is performed.

FIG. 8 is a schematic plan view illustrating how the operation of the signal charge exchange drive is performed.

Figure 9:
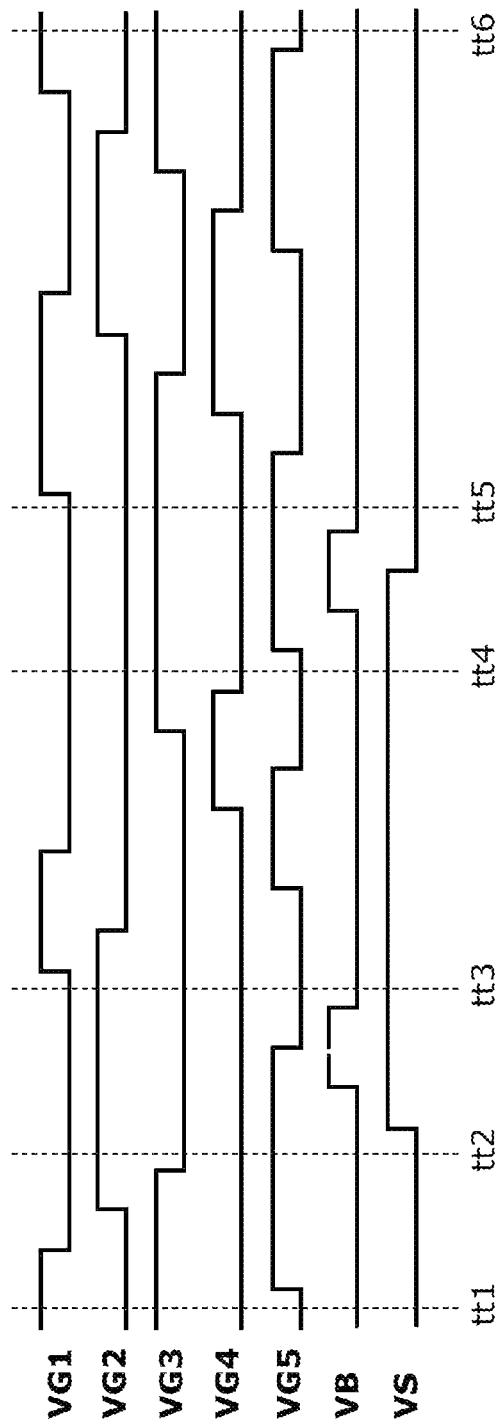
FIG. 9 is a timing chart of drive pulses in the signal charge exchange drive according to Embodiment 1.

FIG. 9 is a timing chart of the drive pulses in the signal charge exchange drive.

In FIG. 8, drive pulses VG1 to VG5 are applied to transfer electrodes 105a to 105e by pixel array controller 11. Thereby, the signal charges can be transferred to desired positions. Drive pulses VS and VB are applied to charge retention gate 111 and transfer control gate 112, respectively, by pixel array controller 11.

In FIG. 8, for easy understanding of a change in position of the transferred signal charge, signal charge A0 and signal charge A1 generated in a specific pixel section 100 are represented by hatched oval shapes which indicate the positions of the signal charges.

Initially, VG1 and VG3 are controlled to a high voltage at time tt1 (namely, time t13 in FIG. 7) at which the first light exposure sequence is completed. Thereby, signal charge A0 and signal charge A1 are accumulated under transfer electrodes 105 (here, transfer electrodes 105a and 105c) to which VG1 and VG3 are applied, respectively.

Next, VG5 and VG2 are controlled to a high voltage at time tt2. Thereby, signal charge A0 and signal charge A1 are accumulated under transfer electrodes 105 (here, transfer electrodes 105e and 105b) to which VG5 and VG2 are applied. In other words, signal charge A0 accumulated under the transfer electrode (here, transfer electrode 105a) to which VG1 is applied at time tt1 is transferred to under transfer electrode 105 (here, transfer electrode 105e) to which VG5 is applied, and signal charge A1 accumulated under the transfer electrode (here, transfer electrode 105c) to which VG3 is applied at time tt1 is transferred to under transfer electrode 105 (here, transfer electrode 105b) to which VG2 is applied. Next, as illustrated in FIG. 9, VS is controlled to a high voltage, and then VB is controlled to a high voltage. Thereby, a charge transfer path is formed between signal exchanger 110 and charge accumulator 102 of transfer electrode 105 (here, transfer electrode 105e) to which VG5 is applied. Subsequently, a low voltage is sequentially applied to VG5 and VB to transfer signal charge A0 to under charge retention gate 111 (tt3). As described above, pixel array controller 11 outputs a first signal for transferring the signal charge accumulated in one of charge accumulators 102 from the one of charge accumulators 102 to signal exchanger 110.

Next, at time tt3, signal charge A1 located in a lower position in FIG. 8 is transferred to an upper position with respect to signal charge A0 accumulated under charge retention gate 111 by 5-phase drive. Signal charge A1 is moved across charge retention gate 111 to under transfer electrode 105 to which VG3 is applied (tt4).

Subsequently, VG5 and VB are controlled to a high voltage again. Thereby, a charge transfer path is formed between signal exchanger 110 and charge accumulator 102 in transfer electrode 105 (here, transfer electrode 105e) to which VG5 is applied. Subsequently, a low voltage is sequentially applied to VS and VB, and then signal charge A0 is transferred to under transfer electrode 105 (here, transfer electrode 105e) to which VG5 is applied (tt5). Thus, pixel array controller 11 outputs a second signal for transferring the signal charge accumulated in signal exchanger 110 from signal exchanger 110 to one of charge accumulators 102.

Next, signal charge A0 and signal charge A1 are transferred by 5-phase drive downwardly in FIG. 8, so that signal charge A0 and signal charge A1 are moved to exchange the positions at time tt1. Hereinafter, this series of operations is called a signal charge exchange operation. As described above, by outputting a drive signal including the first signal and the second signal, pixel array controller 11 can move signal charge A0 accumulated in charge accumulator 102 through first read-out gate 106a in the first light exposure sequence to second charge accumulator 102b and can move signal charge A1 accumulated in charge accumulator 102 through second read-out gate 106b in the first light exposure sequence to first charge accumulator 102a.

Next, the second light exposure sequence will be described.

Figure 10:
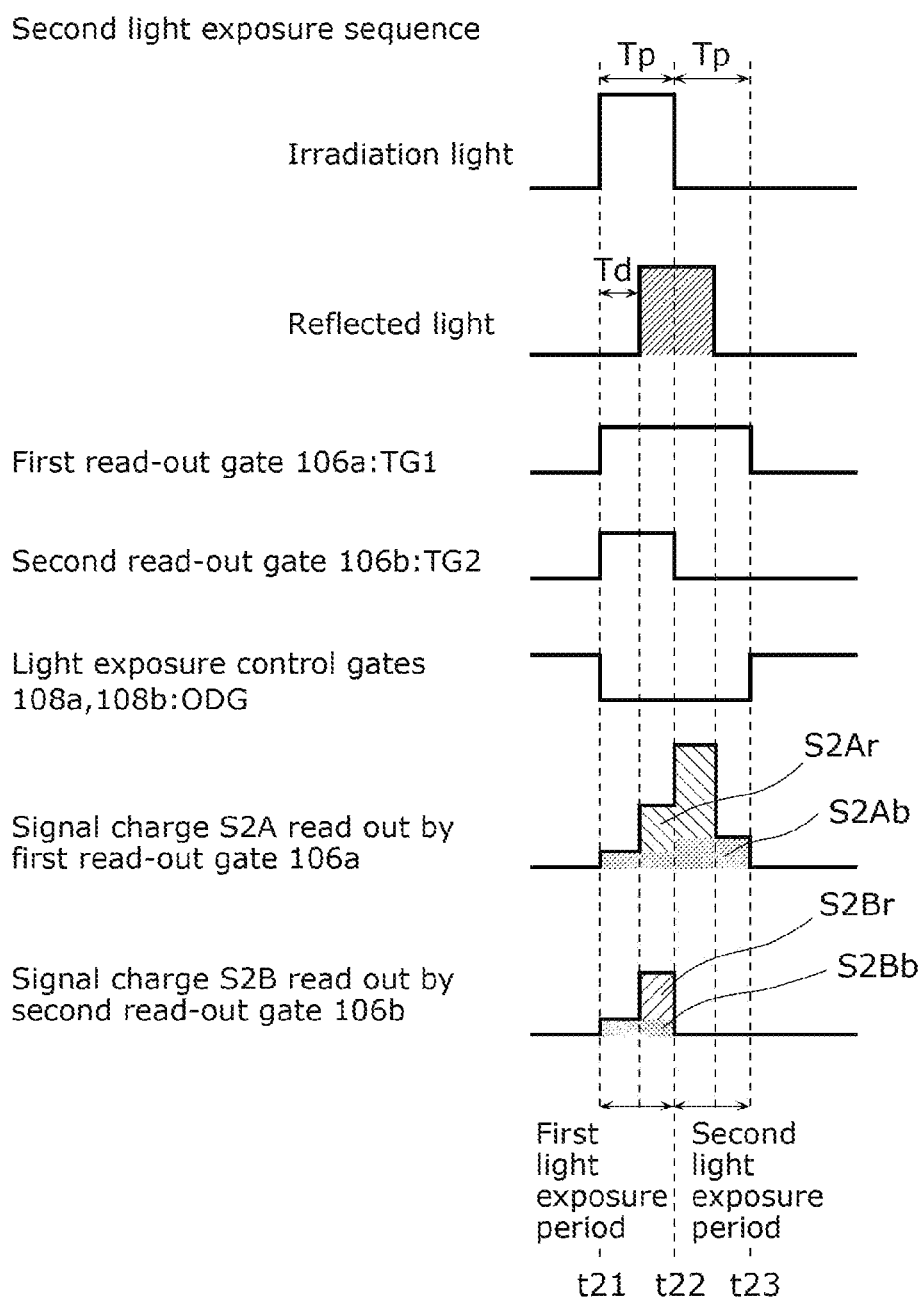
FIG. 10 is a timing chart of a second light exposure sequence according to Embodiment 1.

FIG. 10 is a timing chart of the second light exposure sequence showing the light emission timing of light emitter 4, the light exposure and signal accumulation timing in pixel section 100, and the light exposure states of the respective signal charges accumulated in charge accumulators 102 through first read-out gate 106a and second read-out gate 106b.

Immediately before the second light exposure sequence starts, first charge accumulator 102a retains signal charge A1 generated in the first light exposure sequence and second charge accumulator 102b retains signal charge A0 generated in the first light exposure sequence.

As in the first light exposure sequence, the second light exposure sequence also includes a first light exposure period (also referred to as "fifth period") synchronizing with time Tp from the start of irradiation to the end of irradiation with the pulsed light emitted from light emitter 4 having a timing controlled by controller 3, and a second light exposure period (also referred to as "sixth period") until time Tp passes from the end of irradiation with the pulsed light. As illustrated in FIGS. 7 and 10, the phase difference in the fifth period with respect to emission of the pulsed light by light emitter 4 is equal to that in the first period with respect to emission of the pulsed light by light emitter 4. The phase difference in the sixth period with respect to emission of the pulsed light by light emitter 4 is equal to that in the second period with respect to emission of the pulsed light by light emitter 4.

After the first light exposure period starts, pulsed light having an interval of time Tp is emitted from light emitter 4 according to an instruction by controller 3. The reflected light of the emitted pulsed light reflected from the subject reaches pixel section 100 after a delay of time Td according to the distance from imaging apparatus 1, and is converted to a signal charge in photoelectric converter 101.

According to an instruction by controller 3, pixel array controller 11 transits ODG from a high state (activated state) to a low state (deactivated state) synchronizing with time t11 at which the first light exposure period starts, and concurrently transits first read-out gate 106a and second read-out gate 106b from the low state (deactivated state) to the high state (activated state).

By the operation of pixel array controller 11, discharge of the signal charge from photoelectric converter 101 to overflow drain 109 is stopped, and the signal charge generated in photoelectric converter 101 by receiving an early arriving component of the reflected light of the pulsed light emitted from light emitter 4 which reaches photoelectric converter 101 in the first light exposure period and by receiving the background light other than the reflected light reaching there in the first light exposure period is accumulated in first charge accumulator 102a through first read-out gate 106a and in second charge accumulator 102b through second read-out gate 106b.

Next, in the second light exposure period, according to an instruction by controller 3, pixel array controller 11 transits second read-out gate 106b from the high state (activated state) to the low state (deactivated state) at time t22 (timing of the start). Thereby, the accumulation of the signal charge in second charge accumulator 102b is stopped.

By the control operation described above, the signal charge generated in photoelectric converter 101 by receiving a lately arriving component of the reflected light which reaches photoelectric converter 101 after time t22 in the second light exposure period and by receiving the background light which reaches photoelectric converter 101 in the second light exposure period is totally accumulated in first charge accumulator 102a through first read-out gate 106a.

At time t23, which is the end of the second light exposure period, according to an instruction by controller 3, pixel array controller 11 stops the accumulation of the signal charge in first charge accumulator 102a by transiting first read-out gate 106a from the high state (activated state) to the low state (deactivated state), and converts light exposure control gate 108 to an electrically conducted state by transiting ODG from the low state (deactivated state) to the high state (activated state). Thereby, photoelectric converter 101 is reset.

At the end of the second light exposure sequence, signal charge A1 accumulated in the first light exposure sequence before the start of the second light exposure sequence is accumulated in first charge accumulator 102a and signal charge A0 accumulated in the first light exposure sequence before the start of the second light exposure sequence is accumulated in second charge accumulator 102b. Thus, the relations represented by the following expressions are established for signal charge A0 and signal charge A1 after second light exposure sequence is completed:

$$A0 = S1A + S2B$$

$$A1 = S1B + S2A$$

where the signal charge accumulated in charge accumulator 102 through first read-out gate 106a is defined as S2A and the signal charge accumulated in charge accumulator 102 through second read-out gate 106b is defined as S2B.

Furthermore, signal charge S2A is made of signal charge S2Ar generated in photoelectric converter 101 by receiving the pulsed reflected light and signal charge S2Ab generated in photoelectric converter 101 by receiving the background light other than the pulsed reflected light, and signal charge S2B is made of signal charge S2Br generated in photoelectric converter 101 by receiving the pulsed reflected light and signal charge S2Bb generated in photoelectric converter 101 by receiving the background light other than the pulsed reflected light. Thus, the relations represented by the following expressions are established:

$$A0 = (S1Ar + S2Br) + (S1Ab + S2Bb) \quad \text{(Expression 7)}$$

$$A1 = (S1Br + S2Ar) + (S1Bb + S2Ab) \quad \text{(Expression 8)}$$

Signal charge A0 obtained as a result of the first light exposure sequence and the second light exposure sequence is made of a component obtained through addition average of signal charge S1Ar accumulated through first read-out gate 106a and signal charge S2Br accumulated through second read-out gate 106b out of the signal charges generated in photoelectric converter 101 by receiving the pulsed reflected light in the first light exposure periods of the first and second light exposure sequences, and a component obtained through addition average of signal charge S1Ab accumulated through first read-out gate 106a and signal charge S2Bb accumulated through second read-out gate 106b out of the signal charges generated in photoelectric converter 101 by receiving the background light other than the pulsed reflected light in the first light exposure periods of the first and second light exposure sequences. Such a configuration provides signal charge A0 obtained as a result of the first light exposure sequence and the second light exposure sequence as a signal charge such that the difference in transfer properties caused by a variation in properties in the semiconductor production process between first read-out gate 106a and second read-out gate 106b are smoothed and cancelled.

As in signal charge A0, this configuration also provides signal charge A1 obtained as a result of the first light exposure sequence and the second light exposure sequence as a signal charge such that the difference in transfer properties caused by a variation in properties in the semiconductor production process between first read-out gate 106a and second read-out gate 106b are smoothed and cancelled.

From above, component (S1Ar+S2Br) of signal charge A0 corresponding to the early arriving component of the reflected light and a component of reflected light component (S1Br+S2Ar) of signal charge A1 accumulated in the first light exposure period have the same charge amount because the differences in transfer properties between first read-out gate 106a and second read-out gate 106b are cancelled.

Figure 11:
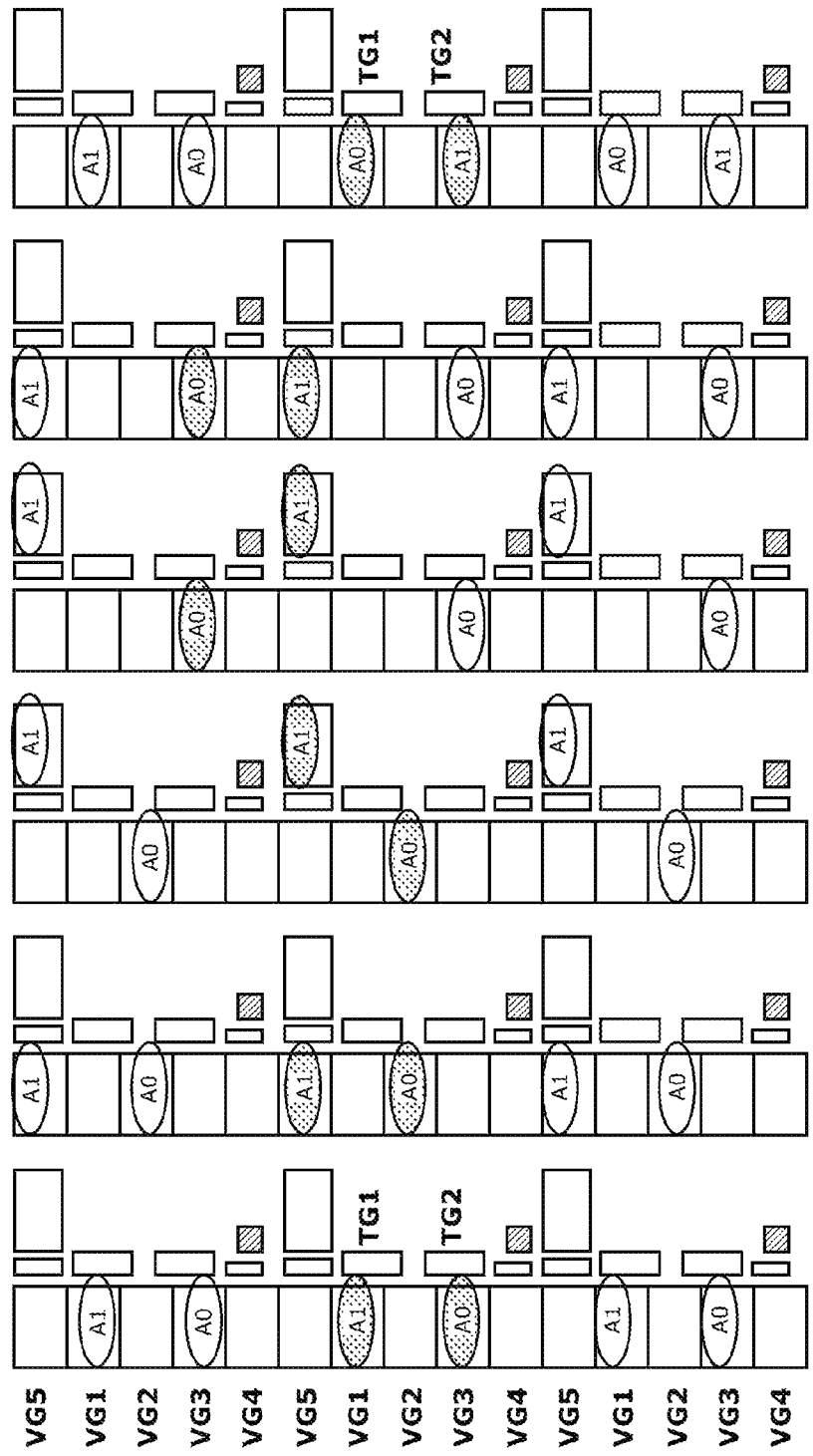
FIG. 11 is a schematic plan view illustrating the signal charge exchange drive according to Embodiment 1.

FIG. 11 is a schematic plan view illustrating how the operation of the signal charge exchange drive is performed in the case where signal charge A1 is accumulated under transfer electrode 105 (here, transfer electrode 105a) to which VG1 is applied and signal charge A0 is accumulated under transfer electrode 105 (here, transfer electrode 105c) to which VG3 is applied.

By performing the operation to exchange the signal charges illustrated in FIG. 11 after the end of the second light exposure sequence, signal charge A0 and signal charge A1 can be returned to the original accumulation positions in the first light exposure sequence. This operation to exchange the signal charges is also referred to as exchange drive for returning the signal charge.

The operation of exposure to reflected light can be performed several times by repeating the "first light exposure sequence", the "signal charge exchange drive", the "second light exposure sequence", and the "exchange drive for returning the signal charge" several times. This can reduce unevenness in amount of the signal charge of the background light component in the case where the light quantity of the background light varies according to the time, for example.

Next, reading-out of the irradiation light exposure signal will be described.

In the reading-out of the irradiation light exposure signal, signal charges A0 and signal charges A1 obtained in respective pixel sections 100 by performing the first light exposure sequence and the second light exposure sequence are output from solid-state imaging device 10 to signal processor 2. This step is started after the second light exposure sequence is completed. According to an instruction by controller 3, for all of the pixel sections 100, pixel array controller 11 moves signal charges A0 retained in second charge accumulators 102b to under transfer electrodes 105d, to which VG4 is applied, by charge transfer accompanied by application of the 5-phase drive pulses VG1 to VG5 applied to transfer electrodes 105a to 105e.

According to an instruction by pixel array controller 11, in predetermined one column of pixel sections 100, vertical scanner 12 discharges unnecessary residual charges in floating diffusion layers 114 to reset drains 116 by activating reset gates 115 while output control gates 113 are in the deactivated state, and then outputs non-signal voltage outputs to vertical signal line 16 by activating read-out circuits 117.

According to an instruction by vertical scanner 12, column processor 13 retains the non-signal voltages output to the corresponding vertical signal lines 16 of the respective columns.

Next, in the same one column of pixel sections 100, vertical scanner 12 discharges unnecessary residual charges in floating diffusion layers 114 to reset drains 116 by activating reset gates 115 while output control gates 113 are in the deactivated state, transfers signal charges A0 retained under transfer electrodes 105d to floating diffusion layers 114 by activating output control gates 113, and then outputs the signal voltage outputs of signal charges A0 to vertical signal line 16 by activating read-out circuits 117.

According to an instruction by vertical scanner 12, column processor 13 performs correlated double sampling from the non-signal voltages of the columns previously retained and the signal voltages of signal charges A0, and outputs and retains pixel signals A0 of the respective columns to and in horizontal scanner 14.

According to an instruction by vertical scanner 12, horizontal scanner 14 sequentially selects pixel signals A0 corresponding to pixel sections 100 in a predetermined column in the horizontal direction by sequentially scanning groups of pixel signals A0 for one column output from column processor 13 and retained in horizontal scanner 14, and outputs pixel signals A0 to signal processor 2 through output buffer 15.

Vertical scanner 12 successively, column by column, performs a series of operations from control of the output of the non-signal voltage to control of the output of pixel signals A0 for one column by horizontal scanner 14, and outputs all the pixel signals A0 of corresponding pixel sections 100 from solid-state imaging device 10 through output buffer 15 by raster scanning.

According to an instruction by controller 3, signal processor 2 temporarily retains pixel signals A0 of all of the pixel sections 100 output from solid-state imaging device 10 by raster scanning.

Next, for all of the pixel sections 100, pixel array controller moves signal charges A1 retained in second charge accumulators 102b to transfer electrodes 105d, to which VG4 is applied, by charge transfer accompanied by application of the 5-phase drive pulses VG1 to VG5 applied to transfer electrodes 105a to 105e. Subsequently, the same operation as that in the control of the output of pixel signal A0 is performed, and all the pixel signals A1 of corresponding pixel sections 100 are output from solid-state imaging device 10 through output buffer 15 by raster scanning.

According to an instruction by controller 3, signal processor 2 temporarily retains pixel signals A1 of all the pixel sections 100 output from solid-state imaging device 10 by raster scanning.

Next, a third light exposure sequence will be described.

Figure 12:
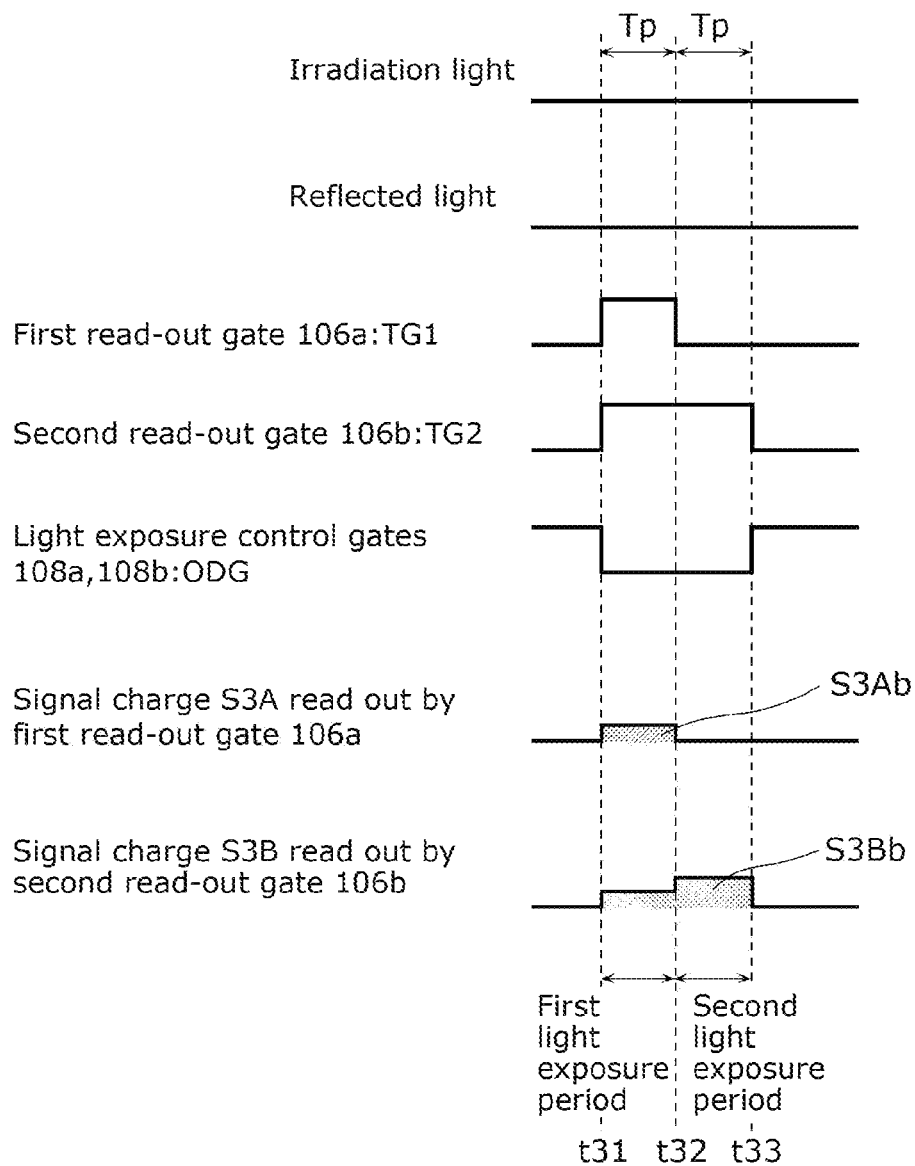
FIG. 12 is a timing chart of a third light exposure sequence according to Embodiment 1.

FIG. 12 is a timing chart of the third light exposure sequence showing the light emission timing of light emitter 4, the light exposure and signal accumulation timing in pixel section 100, and the light exposure states of the respective signal charges accumulated in charge accumulators 102 through first read-out gate 106a and second read-out gate 106b.

The third light exposure sequence includes a first light exposure period (also referred to as "third period") having the same length as that of time Tp from the start of irradiation to the end of irradiation with pulsed light from light emitter 4 in the first light exposure sequence and a second light exposure period (also referred to as "fourth period") until time Tp passes from the end of the first light exposure period. As illustrated in FIGS. 7 and 11, the third period has the same time interval as that of the first period, and the fourth period has the same time interval as that of the second period.

In the third light exposure sequence, the pulsed light is not emitted from light emitter 4.

After the third light exposure sequence starts, according to an instruction by controller 3, pixel array controller 11 transits ODG from the high state (activated state) to the low state (deactivated state) synchronizing with time t31 at which the first light exposure period starts, and concurrently transits first read-out gate 106a and second read-out gate 106b from the low state (deactivated state) to the high state (activated state).

By the operation performed by pixel array controller 11, the discharge of the signal charge from photoelectric converter 101 to overflow drain 109 is stopped, and the signal charge generated in photoelectric converter 101 by receiving the background light which reaches photoelectric converter 101 in the first light exposure period is accumulated in first charge accumulator 102a through first read-out gate 106a and in second charge accumulator 102b through second read-out gate 106b.

Next, in the second light exposure period, according to an instruction by controller 3, pixel array controller 11 transits first read-out gate 106a from the high state (activated state) to the low state (deactivated state) at time t32 (timing of the start). Thereby, the accumulation of the signal charge in first charge accumulator 102a is stopped.

By the control operation described above, the signal charge generated in photoelectric converter 101 by receiving the background light which reaches photoelectric converter 101 after time t32 in the second light exposure period is totally accumulated in second charge accumulator 102b through second read-out gate 106b.

At time t33, which is the end of the second light exposure period, according to an instruction by controller 3, pixel array controller 11 stops the accumulation of the signal charge in second charge accumulator 102b by transiting second read-out gate 106b from the high state (activated state) to the low state (deactivated state), and converts light exposure control gate 108 to an electrically conducted state by transiting ODG from the low state (deactivated state) to the high state (activated state). Thereby, photoelectric converter 101 is reset.

At the end of the third light exposure sequence, the relations represented by the following expressions are established:

$$A2=S3A \quad \text{(Expression 9)}$$

$$A3=S3B \quad \text{(Expression 10)}$$

where the signal charge accumulated in charge accumulator 102 through first read-out gate 106a is defined as S3A, the signal charge accumulated in charge accumulator 102 through second read-out gate 106b is defined as S3B, the signal charge accumulated in first charge accumulator 102a is defined as A2, and the signal charge accumulated second charge accumulator 102b is defined as A3.

Furthermore, signal charge S3A is made of signal charge S3Ab generated in photoelectric converter 101 by receiving the background light, and signal charge S3B is made of signal charge S3Bb generated in photoelectric converter 101 by receiving the background light.

$$A2=S3Ab \quad \text{(Expression 11)}$$

$$A3=S3Bb \quad \text{(Expression 12)}$$

As described above, in the third light exposure sequence, the charge is concurrently transferred to two charge accumulators 102, i.e., first charge accumulator 102a and second charge accumulator 102b in the first light exposure period. For this reason, the charge amount corresponding to about a half of the signal charge generated in photoelectric converter 101 in the first light exposure period is accumulated in each of charge accumulators 102.

As described for the first light exposure sequence above, there may be a possibility that the amount of the signal charge accumulated in first charge accumulator 102a in the first light exposure period and that of the signal charge accumulated in second charge accumulator 102b in the first light exposure period are not exactly 50% of the amount of the signal charge accumulated in generated in photoelectric converter 101 in the first light exposure period.

As illustrated in FIG. 6, after the third light exposure sequence ends, the signal exchange drive mentioned above is again performed. After the signal exchange drive ends, the fourth light exposure sequence is performed. Thereby, before the fourth light exposure sequence starts, signal charge A2 accumulated in charge accumulator 102 through first read-out gate 106a in the third light exposure sequence is moved to second charge accumulator 102b, signal charge A3 accumulated in charge accumulator 102 through second read-out gate 106b is moved to first charge accumulator 102a.

Figure 13:
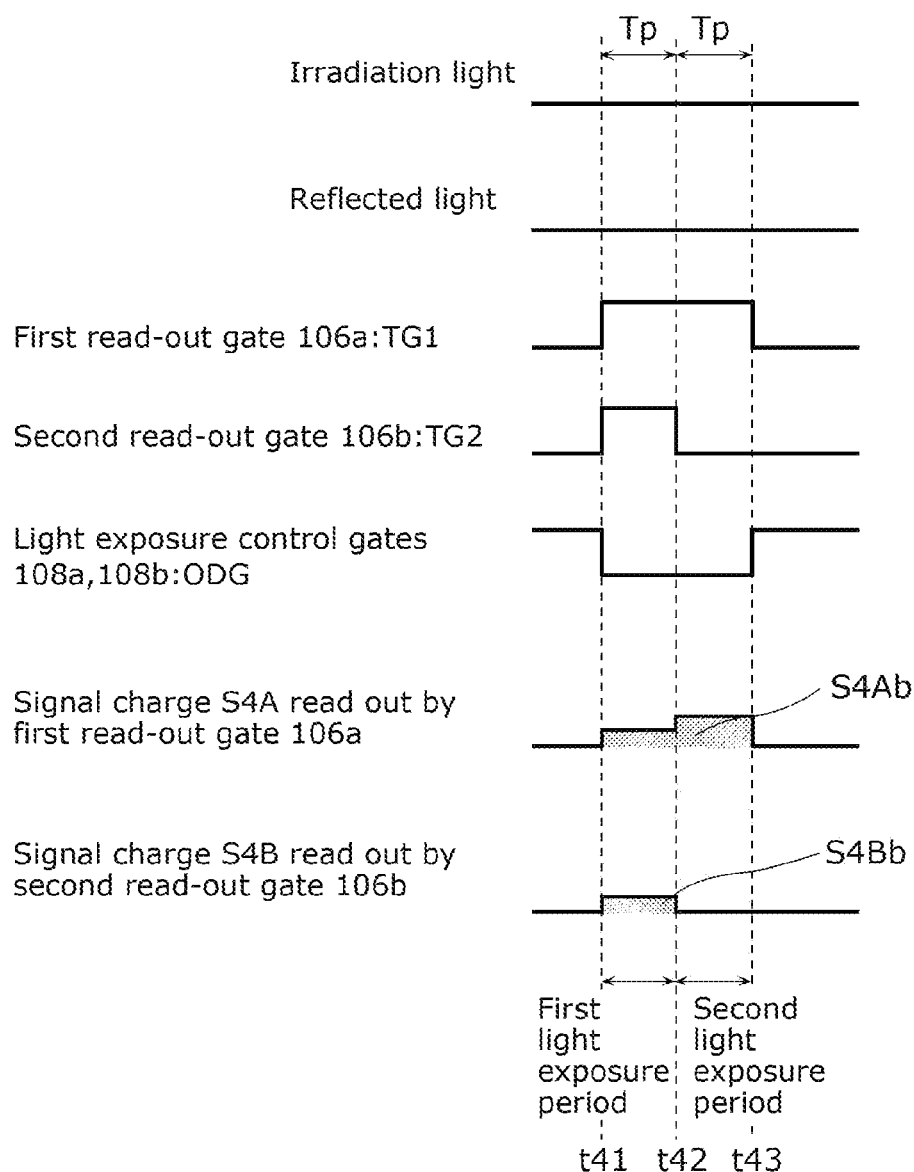
FIG. 13 is a timing chart of a fourth light exposure sequence according to Embodiment 1.

Next, the fourth light exposure sequence will be described. FIG. 13 is a timing chart of the fourth light exposure sequence illustrating the light emission timing of light emitter 4, the light exposure and signal accumulation timing in pixel section 100, and the light exposure states of the signal charges accumulated in charge accumulators 102 through first read-out gate 106a and second read-out gate 106b.

Similarly to the third light exposure sequence, the fourth light exposure sequence includes a first light exposure period (also referred to as "seventh period") having the same length as that of time Tp from the start of irradiation to the end of irradiation with pulsed light from light emitter 4 in the first light exposure sequence and a second light exposure period (also referred to as "eighth period") until time Tp passes from the end of the first light exposure period. As illustrated in FIGS. 10 and 13, the seventh period has the same time interval as that of the fifth period, and the eighth period has the same time interval as that of the sixth period.

In the fourth light exposure sequence, the pulsed light is not emitted from light emitter 4.

After the fourth light exposure sequence starts, according to an instruction by controller 3, pixel array controller 11 transits ODG from the high state (activated state) to the low state (deactivated state) synchronizing with time t41 at which the first light exposure period starts, and concurrently transits first read-out gate 106a and second read-out gate 106b from the low state (deactivated state) to the high state (activated state).

By the operation performed by pixel array controller 11, the discharge of the signal charge from photoelectric converter 101 to overflow drain 109 is stopped, and the signal charge generated in photoelectric converter 101 by receiving the background light which reaches photoelectric converter 101 in the first light exposure period is accumulated in first charge accumulator 102a through first read-out gate 106a and in second charge accumulator 102b through second read-out gate 106b.

Next, in the second light exposure period, according to an instruction by controller 3, pixel array controller 11 transits second read-out gate 106b from the high state (activated state) to the low state (deactivated state) at time t42 (timing of the start). Thereby, the accumulation of the signal charge in second charge accumulator 102b is stopped.

By the control operation described above, the signal charge generated in photoelectric converter 101 by receiving the background light which reaches photoelectric converter 101 after time t42 in the second light exposure period is totally accumulated in first charge accumulator 102a through first read-out gate 106a.

At time t43, which is the end of the second light exposure period, according to an instruction by controller 3, pixel array controller 11 stops the accumulation of the signal charge in first charge accumulator 102a by transiting first read-out gate 106a from the high state (activated state) to the low state (deactivated state), and converts light exposure control gate 108 to an electrically conducted state by transiting ODG from the low state (deactivated state) to the high state (activated state). Thereby, photoelectric converter 101 is reset.

At the end of the fourth light exposure sequence, signal charge A3 accumulated in the third light exposure sequence is accumulated in first charge accumulator 102a, and signal charge A2 accumulated in the third light exposure sequence is accumulated in second charge accumulator 102b; thus, signal charge A0 and signal charge A1 after the end of the fourth light exposure sequence have the relations represented by the following expressions:

$$A2 = S3A + S4B \quad \text{(Expression 13)}$$

$$A3 = S3B + S4A \quad \text{(Expression 14)}$$

where the signal charge accumulated in charge accumulator 102 through first read-out gate 106a is defined as S4A, and the signal charge accumulated in charge accumulator 102 through second read-out gate 106b is defined as S4B.

Furthermore, signal charge S4A is made of signal charge S4Ab generated in photoelectric converter 101 by receiving the background light, and signal charge S4B is made of signal charge S4Bb generated in photoelectric converter 101 by receiving the background light. Thus, the relations represented by the following expressions are established:

$$A2 = (S3Ab + S4Bb) \quad \text{(Expression 15)}$$

$$A3 = (S3Bb + S4Ab) \quad \text{(Expression 16)}$$

Signal charge A2 obtained as a result of the third light exposure sequence and the fourth light exposure sequence is made of a component obtained through addition average of signal charge S1Ab accumulated through first read-out gate 106a and signal charge S2Bb accumulated through second read-out gate 106b out of the signal charges generated in photoelectric converter 101 by receiving the background light in the first light exposure periods of the third and fourth light exposure sequences. Such a configuration provides signal charge A2 obtained as a result of the third light exposure sequence and the fourth light exposure sequence as a signal charge such that the differences in transfer properties caused by a variation in properties in the semiconductor production process between first read-out gate 106a and second read-out gate 106b are smoothed and cancelled.

Similarly to signal charge A2, this configuration also provides signal charge A3 obtained as a result of the third light exposure sequence and the fourth light exposure sequence as a signal charge such that the differences in transfer properties caused by a variation in properties in the semiconductor production process between first read-out gate 106a and second read-out gate 106b are smoothed and cancelled.

Next, reading-out of the non-irradiation light exposure signal will be described.

In the reading-out of the non-irradiation light exposure signal, signal charges A2 and signal charges A3 obtained in respective pixel sections 100 by performing the third light exposure sequence and the fourth light exposure sequence are output from solid-state imaging device 10 to signal processor 2. This step is started immediately after the fourth light exposure sequence is completed.

The reading-out of the non-irradiation light exposure signal is the step similar to the reading-out of the irradiation light exposure signal described above. In other words, in the reading-out of the non-irradiation light exposure signal, all the pixel signals A1 and all the pixel signals A3 corresponding to pixel sections 100 are output from solid-state imaging device 10 through output buffer 15 by raster scanning, and all the pixel signals A1 and all the pixel signals A3 which are output are retained by signal processor 2.

Next, the calculation of the distance will be described.

The calculation of the distance is a step of calculating distance signal Dout corresponding to each of pixel sections 100 from pixel signals A0, pixel signals A1, pixel signals A2, and pixel signals A3 retained by signal processor 2 in the reading-out of the irradiation light exposure signal and in the reading-out of the non-irradiation light exposure signal.

As a first procedure, signal processor 2 calculates pixel signal A0c from (Expression 17) where the background light component is removed from pixel signal A0 corresponding to each pixel section 100, and calculates pixel signal A1c from (Expression 18) where the background light component is removed from pixel signal A1.

$$A0c = A0 - A2 \quad \text{(Expression 17)}$$

$$A1c = A1 - A3 \quad \text{(Expression 18)}$$

(Expression 17) can be transformed into (Expression 19) below from (Expression 7) and (Expression 15), and (Expression 18) can be transformed into (Expression 20) below from (Expression 8) and (Expression 16):

$$A0c = (S1Ar + S2Br) + (S1Ab + S2Bb) - (S3Ab + S4Bb) \quad \text{(Expression 19)}$$

$$A1c = (S1Br + S2Ar) + (S1Bb + S2Ab) - (S3Bb + S4Ab) \quad \text{(Expression 20)}$$

Here, the combination of pixel signal S1Ab and pixel signal S3Ab and the combination of pixel signal S2Bb and pixel signal S4Bb in (Expression 19) are combinations of signals which correspond to the background light components obtained from the same read-out gate 106 under the same accumulation condition and which have the same amount. Thus, the result of subtraction of the second term and the third term in (Expression 19) is zero, and (Expression 19) can be represented by (Expression 21). Thus, pixel signal A0c obtained from calculation of (Expression 17) corresponds to a pixel signal obtained by removing the background light component from pixel signal A0.

$$A0c = (S1Ar + S2Br) \quad \text{(Expression 21)}$$

Focusing on the combination of pixel signal S1Bb and pixel signal S3Bb and that of pixel signal S2Ab and pixel signal S4Ab, (Expression 20) can be represented by (Expression 22) as above. Thus, pixel signal A1c obtained from calculation of (Expression 18) corresponds to a pixel signal obtained by removing the background light component from pixel signal A1.

$$A1c = (S1Br + S2Ar) \quad \text{(Expression 22)}$$

As a second procedure, using pixel signal A0c and pixel signal A1c obtained from (Expression 17) and (Expression 18), signal processor 2 calculates Dout from (Expression 23) where constant K is used, as follows. Dout calculated from (Expression 23) is equivalent to (Expression 2), and is apparently a distance signal corresponding to the distance to the subject.

$$Dout = K \times (A1c - A0c)/(A1c + A0c) \quad \text{(Expression 23)}$$

Constant K in (Expression 23) corresponds to $c \times Tp/2$ in (Expression 2), and is desirably set according to the finite dynamic range of distance signal Dout.

Apparently from the description of Embodiment 1 above, imaging apparatus 1 operates with low electric power without preparative distance measurement, and can suppress saturation of the signal charge of reflected light reflected from a subject (including a moving subject) in a short distance. Imaging apparatus 1 can also provide highly precise distance information to the subject from which errors caused by a variation in the semiconductor production process are removed.

Although the timing of the start of the first light exposure period temporally matches the start of irradiation of the pulsed light by light emitter 4 and the timing of the end of the first light exposure period temporally matches the timing of the start of the second light exposure period in the illustration in Embodiment 1, the illustration should not be construed as limitations to the present disclosure.

For example, even if the phase of the timing of the first light exposure period and that of the timing of the second light exposure period are temporally shifted ahead or behind with respect to the phase of the irradiation light, monotonically increasing distance information having an intercept can be obtained, in principle, for a change in distance of the subject.

For example, the first light exposure period can be ended earlier by time Ts than the timing of stop of the irradiation light, first read-out gate 106a and second read-out gate 106b can be deactivated synchronizing with the end of the first light exposure period, and read-out gate 106 can be reactivated after time Ts. In this case, monotonically increasing distance information can be obtained for a change in distance of the subject where the measurable distance range falls within the range represented by $(c \times (Tp-Ts)/2)$.

Embodiment 2

The imaging apparatus according to Embodiment 2 will now be described. While the imaging apparatus has the same configuration as that of imaging apparatus 1 according to Embodiment 1, the imaging apparatus performs a modified first light exposure sequence rather than the first light exposure sequence, a modified second light exposure sequence rather than the second light exposure sequence, a modified third light exposure sequence rather than the third light exposure sequence, and a modified fourth light exposure sequence rather than the fourth light exposure sequence.

Initially, the modified first light exposure sequence will be described.

Figure 14:
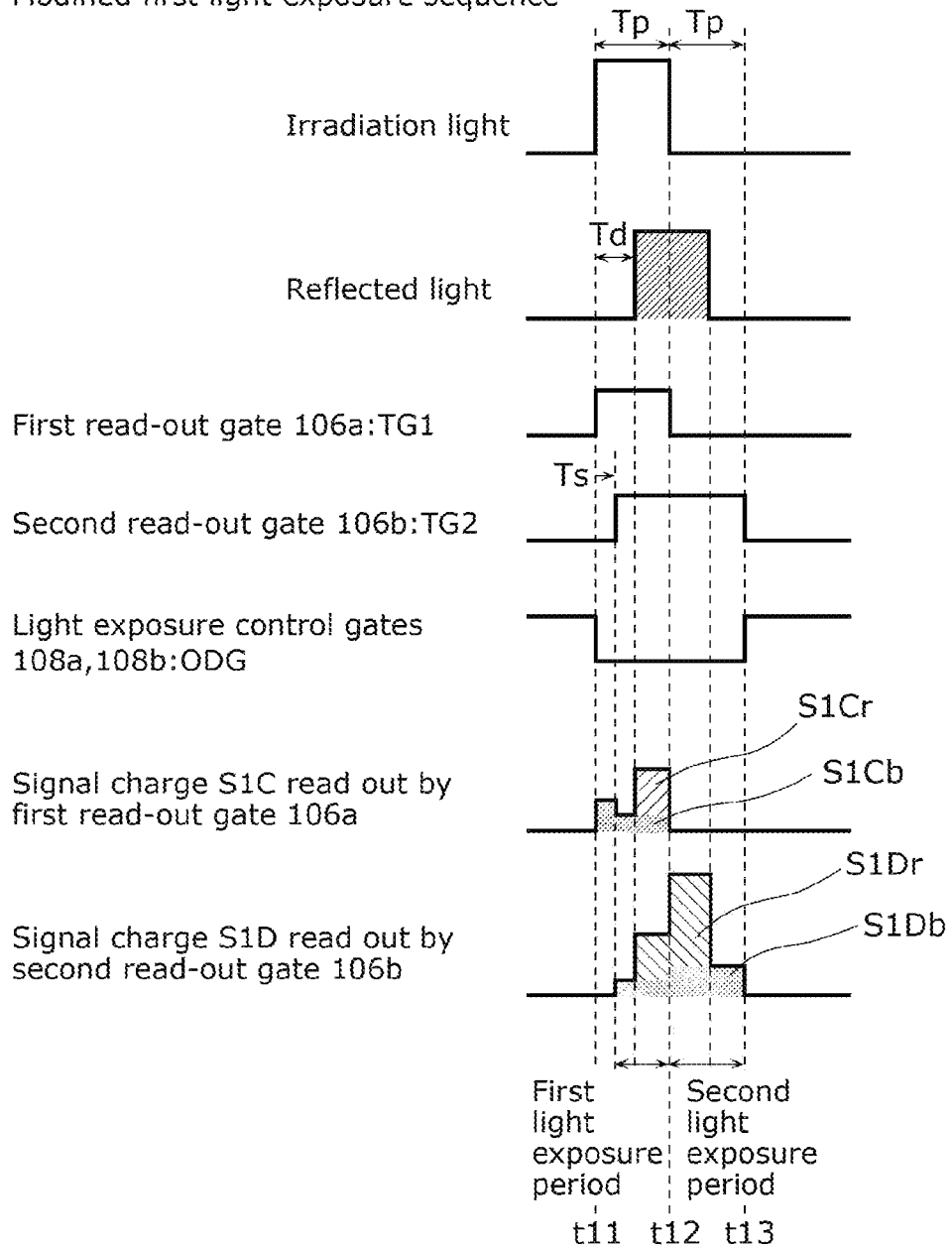
FIG. 14 is a timing chart of a modified first light exposure sequence according to Embodiment 2.

FIG. 14 is a timing chart of the modified first light exposure sequence illustrating the light emission timing of light emitter 4, the light exposure and signal accumulation timing in pixel section 100, and the light exposure states of the signal charges accumulated in charge accumulators 102 through first read-out gate 106a and second read-out gate 106b.

The modified first light exposure sequence includes a zeroth light exposure period (not illustrated) until time Ts passes from the start of irradiation with the pulsed light from light emitter 4 having a timing controlled by controller 3, a first light exposure period (also referred to as "first period") from the point of time at which time Ts has passed to the end of irradiation with the pulsed light, and a second light exposure period (also referred to as "second period") until time Tp passes from the end of irradiation with the pulsed light. As illustrated in FIG. 14, the first period starts before the irradiation with the pulsed light by light emitter 4 stops. The second period is a period subsequent to the first light exposure period. In this period, the time interval between the start of the first light exposure period and the end of the second period is longer than emission period Tp of the pulsed light.

After the modified first light exposure sequence starts, according to an instruction by controller 3, the pulsed light having an interval of time Tp is emitted from light emitter 4. The reflected light of the emitted pulsed light reflected from the subject reaches pixel section 100 after a delay of time Td according to the distance from imaging apparatus 1, and is converted to a signal charge in photoelectric converter 101.

According to an instruction by controller 3, pixel array controller 11 transits ODG from the high state (activated state) to the low state (deactivated state) synchronizing with time t11 at which the zeroth light exposure period starts, and concurrently transits first read-out gate 106a from the low state (deactivated state) to the high state (activated state).

According to an instruction by controller 3, pixel array controller 11 transits second read-out gate 106b from the low state (deactivated state) to the high state (activated state) at a timing at which time Ts has passed from t11.

By the operation of pixel array controller 11, about a half of the signal charge generated by receiving the reflected light of the pulsed light which is emitted from light emitter 4 and reaches photoelectric converter 101 in the first light exposure period is accumulated in first charge accumulator 102a through first read-out gate 106a, and about a half thereof is accumulated in second charge accumulator 102b through second read-out gate 106b. In contrast, the signal charge generated by receiving the background light in the zeroth light exposure period is accumulated only in first charge accumulator 102a through first read-out gate 106a, and about a half of the signal charge generated by receiving the background light component in the first period is accumulated in first charge accumulator 102a through first read-out gate 106a and about a half thereof is accumulated in second charge accumulator 102b through second read-out gate 106b.

The operation in the second light exposure period of the modified first light exposure sequence is the same as that in the second light exposure period of the first light exposure sequence according to Embodiment 1.

Next, the modified third light exposure sequence will be described.

Figure 15:
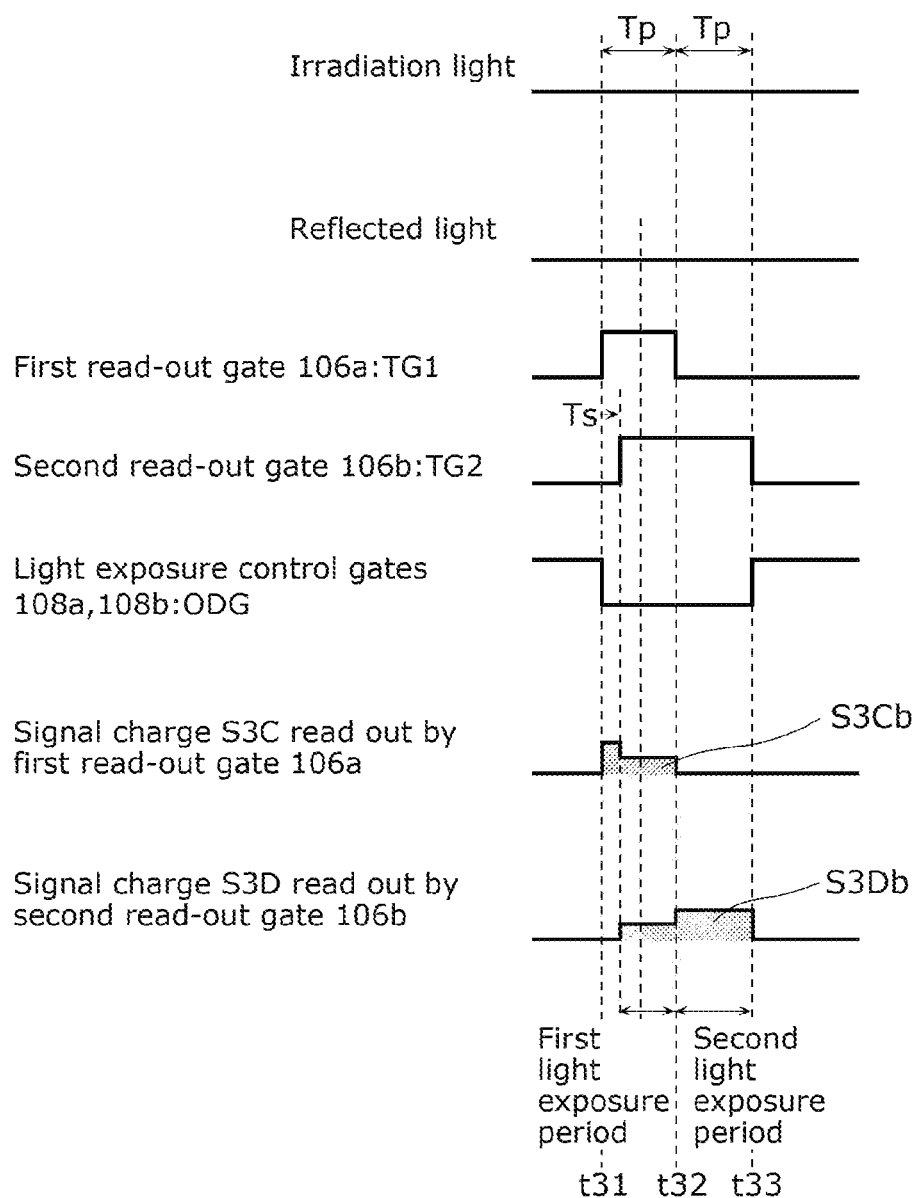
FIG. 15 is a timing chart of a modified third light exposure sequence according to Embodiment 2.

FIG. 15 is a timing chart of the modified third light exposure sequence illustrating the light emission timing of light emitter 4, the light exposure and signal accumulation timing in pixel section 100, and the light exposure states of the signal charges accumulated in charge accumulators 102 through first read-out gate 106a and second read-out gate 106b.

The modified third light exposure sequence includes a zeroth light exposure period (not illustrated) having the same length as that of time Ts in the modified first light exposure sequence, a first light exposure period (also referred to as "third period") until time (Tp−Ts) passes from the end of the zeroth light exposure period, and a second light exposure period (also referred to as "fourth period") until time Tp passes from the end of the first light exposure period. As illustrated in FIGS. 14 and 15, the third period has the same time interval as that of the first period, and the fourth period has the same time interval as that of the second period.

In the modified third light exposure sequence, the pulsed light is not emitted from light emitter 4.

After the modified third light exposure sequence starts, according to an instruction by controller 3, pixel array controller 11 transits ODG from the high state (activated state) to the low state (deactivated state) synchronizing with time t31 at which the zeroth light exposure period starts, and concurrently transits first read-out gate 106a from the low state (deactivated state) to the high state (activated state).

According to an instruction by controller 3, pixel array controller 11 transits second read-out gate 106b from the low state (deactivated state) to the high state (activated state) at a timing at which time Ts has passed from t31.

By the operation of pixel array controller 11, the signal charge generated by receiving the background light in the zeroth light exposure period is accumulated only in first charge accumulator 102a through first read-out gate 106a, and about a half of the signal charge generated by receiving the background light component in the first period is accumulated in first charge accumulator 102a through first read-out gate 106a and about a half thereof is accumulated in second charge accumulator 102b through second read-out gate 106b.

The operation in the second light exposure period of the modified third light exposure sequence is the same as that in the second light exposure period of the third light exposure sequence according to Embodiment 1.

Signal charge A0' obtained in first charge accumulator 102a in the modified first light exposure sequence is made of signal charge S1Cr, which is generated in photoelectric converter 101 by receiving an early arriving component of the reflected light of the pulsed light emitted from light emitter 4 which reaches photoelectric converter 101 in the first light exposure period, and signal charge S1Cb generated in photoelectric converter 101 by receiving the background light other than the reflected light reaching in the first light exposure period.

Signal charge A2' obtained in first charge accumulator 102a in the modified third light exposure sequence is made of signal charge S3Cb generated in photoelectric converter 101 by receiving the background light other than the reflected light reaching there in the first light exposure period. Because this signal charge S3Cb is a component obtained from the same first read-out gate 106a under the same accumulation condition as those of signal charge S1Cb above, the background light component is removed from signal charge A0c' determined by (Expression 24):

$$A0c'=A0'-A2'(=S1Cr+S1Cb-S3Cb) \quad \text{(Expression 24)}$$

For signal charge A1' obtained in second charge accumulator 102b in the modified first light exposure sequence and signal charge A3' obtained in second charge accumulator 102b in the modified third light exposure sequence, signal charge S1Db as a background light component is equal to signal charge S3Db as a background light component as described above. Thus, the background light component is removed from signal charge A1c' determined from (Expression 25):

$$A1c'=A1'-A3'(=S1Dr+S1Db-S3Db) \quad \text{(Expression 25)}$$

As described above, a pixel signal from which the background light is correctly removed can be obtained even if the start of activation of second read-out gate 106b is delayed by time Ts with respect to the activation timing of first read-out gate 106a. Thus, in the modified second light exposure sequence and the modified fourth light exposure sequence, the distance signal calculated by signal processor 2 in the same way as that in Embodiment 1 is also obtained in the same way as above from the pixel signal obtained with a delayed start of second read-out gate 106b by time Ts.

Compared to pixel signal A0', pixel signal A1 is exposed to light for a longer time, which results in a relatively larger signal amount and thus reduces the received component of the background light. Thus, signal saturation in charge accumulator 102 is further suppressed in the imaging apparatus according to Embodiment 2.

To be noted, in the case where the closest measurable distance required is defined as Dcl, time Tp is desirably set in a range satisfying (Expression 26) below:

$$Ts<2\times Dcl/c \quad \text{(Expression 26)}$$

The right side of (Expression 26) corresponds to the round-trip time of light to a subject in distance Dcl.

Embodiment 3

The imaging apparatus according to Embodiment 3 will now be described. This imaging apparatus includes pixel section 100b, rather than pixel section 100 included in imaging apparatus 1 according to Embodiment 1. In the description below, identical reference signs will be given to components of the imaging apparatus according to Embodiment 3 identical to those of pixel section 100 according to Embodiment 1, and the detailed description thereof will be omitted because those have been already described.

Figure 16:
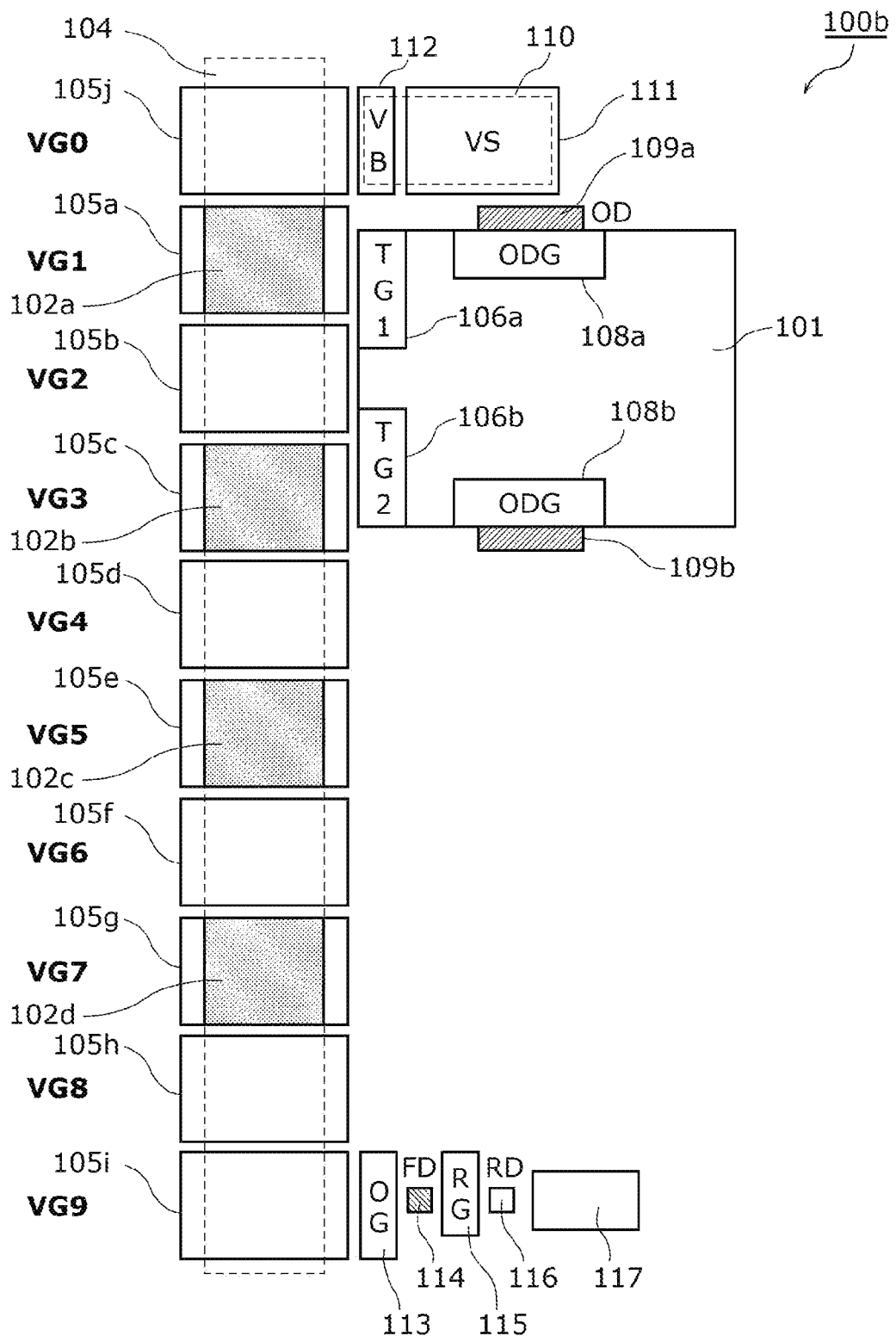
FIG. 16 is a block diagram illustrating an example of the configuration of the pixel section according to Embodiment 2.

FIG. 16 is a schematic view illustrating an example of the configuration of pixel section 100b.

Unlike pixel section 100 according to Embodiment 1 including five transfer electrodes 105 (transfer electrodes 105a, 105b, 105c, 105d, and 105e) (see FIG. 5), pixel section 100b includes ten transfer electrodes 105 (transfer electrodes 105a, 105b, 105c, 105d, 105e, 105f, 105g, 105h, 105i, and 105j) as illustrated in FIG. 16.

In the present embodiment, voltages VG1, VG2, VG3, VG4, VG5, VG6, VG7, VG8, VG9, and VG0 are applied to transfer electrodes 105 (transfer electrodes 105a, 105b, 105c, 105d, 105e, 105f, 105g, 105h, 105i, and 105j), respectively.

In such a configuration, four separated charge accumulators 102 (here, first charge accumulator 102a, second charge accumulator 102b, third charge accumulator 102c, and fourth charge accumulator 102d) can be formed in one pixel section 100b.

First charge accumulator 102a, second charge accumulator 102b, third charge accumulator 102c, and fourth charge accumulator 102d are formed below transfer electrodes 105 in the depth directions thereof (here, below transfer electrodes 105a, 105c, 105e, and 105g in the depth directions) under high voltages VG1, VG3, VG5, and VG7 applied by pixel array controller 11.

First charge accumulator 102a and second charge accumulator 102b are adjacent to first read-out gate 106a and second read-out gate 106b, respectively. The signal charge generated in photoelectric converter 101 is accumulated in first charge accumulator 102a and second charge accumulator 102b through first read-out gate 106a and second read-out gate 106b in the activated state.

Figure 17:
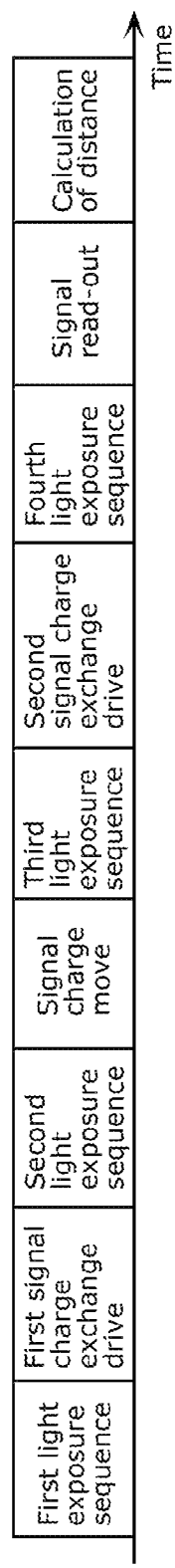
FIG. 17 is an operation sequence diagram of the operation performed by the imaging apparatus according to Embodiment 3.

FIG. 17 is an operation sequence diagram illustrating an operation performed by the imaging apparatus according to Embodiment 3.

As illustrated in FIG. 17, the imaging apparatus according to Embodiment 3 sequentially performs steps included in a first light exposure sequence, first signal charge exchange drive, a second light exposure sequence, signal charge move, a third light exposure sequence, second signal charge exchange drive, a fourth light exposure sequence, signal read-out, and calculation of a distance.

The first light exposure sequence, the second light exposure sequence, the third light exposure sequence, the fourth light exposure sequence, and the calculation of the distance according to Embodiment 3 are identical to those according to Embodiment 1.

Because the signal charges can be accumulated in four places in pixel section 100b in the imaging apparatus according to Embodiment, signal charges A0, A1, A2, and A3 can be continuously generated without being read out halfway.

Figure 18:
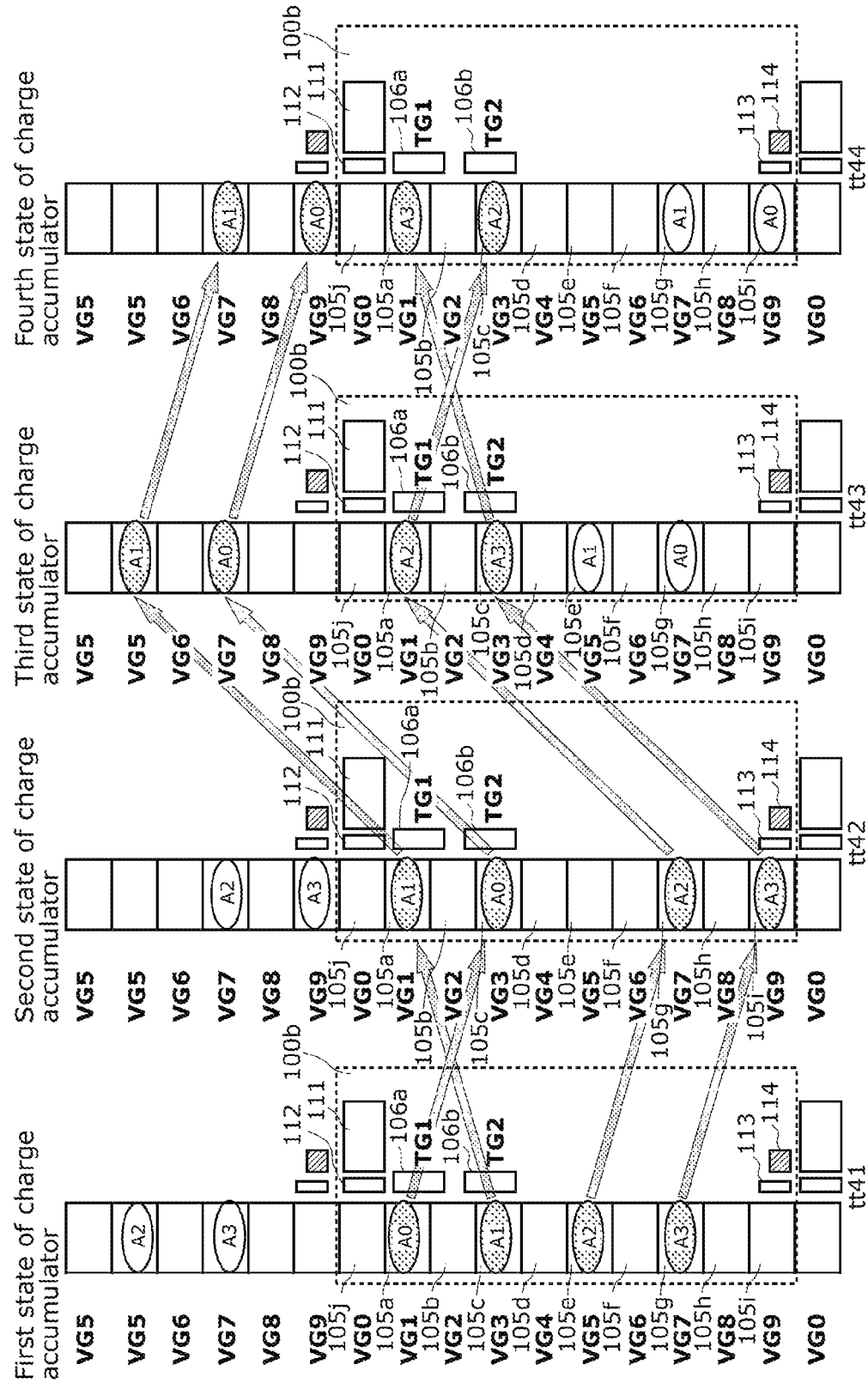
FIG. 18 is a schematic plan view illustrating an arrangement relation among signal charges A0, A1, A2, and A3.

FIG. 18 is a schematic plan view illustrating the arrangement relation among signal charges A0, A1, A2, and A3.

In FIG. 18, the first state of the charge accumulator indicates the positional relation in arrangement of the signal charges at time tt41 at which the first light exposure sequence is completed, the second state of the charge accumulator indicates the positional relation in arrangement of the signal charges at time tt42 at which the second light exposure sequence starts, the third state of the charge accumulator indicates the positional relation in arrangement of the signal charges at time tt43 at which the third light exposure sequence is completed, and the fourth state of the charge accumulator indicates the positional relation in arrangement of the signal charges at time tt44 at which the fourth light exposure sequence starts.

In the first signal charge exchange drive, the positional relation between signal charge A0 and signal charge A1 is changed from the first state of the charge accumulator to the second state of the charge accumulator by 10-phase drive control of transfer electrode 105 and voltage control of transfer control gate 112 and charge retention gate 111 similar to that in Embodiment 1 by pixel array controller 11.

In the signal charge move, signal charges A0, A1, A2, and A3 are moved upwardly by five electrodes by drive control of transfer electrode 105 by pixel array controller 11 to change the second state of the charge accumulator to the third state of the charge accumulator.

In the second signal charge exchange drive, the positional relation between signal charge A2 and signal charge A3 is changed from the third state of the charge accumulator to the fourth state of the charge accumulator by the 10-phase drive control of transfer electrode 105 and the voltage control of transfer control gate 112 and charge retention gate 111 similar to that in Embodiment 1 by pixel array controller 11.

In the signal read-out, signal charges A0, A1, A2, and A3 obtained in each pixel section 100b by the first light exposure sequence to the fourth light exposure sequence are read out, and pixel signals A0, A1, A2, and A3 of all the pixel sections 100b are output from solid-state imaging device 10 to signal processor 2. In other words, while horizontal scanner 14 is performing horizontal scan, pixel array controller 11 and vertical scanner 12 successively output signal charges A0, A1, A2, and A3 from a column of pixel sections 100b to column processor 13 to output all the pixel signals A0, A1, A2, and A3 from the column of pixel sections 100b in a continuous horizontal synchronizing period. Thereafter, the output processing is performed on another column of pixel sections 100b to output pixel signals A0, A1, A2, and A3 corresponding to all the pixel sections 100b from solid-state imaging device 10.

The imaging apparatus according to Embodiment 3 including pixel section 100b having the above-mentioned configuration and performing the above-mentioned operation can output pixel signals A0, A1, A2, and A3 having the same properties as those in Embodiment 1, in batch, after the fourth light exposure sequence. This shortens the difference in time between the first light exposure sequence and the second light exposure sequence and the difference in time between the third light exposure sequence and the fourth light exposure sequence. For this reason, the imaging apparatus according to Embodiment 3 can remove the background light with higher precision under circumstances where the background light temporally changes, in particular.

Furthermore, apparently, the imaging apparatus according to Embodiment 3 can input all the pixel signals A0, A1, A2, and A3 corresponding to a column of pixel sections 100b to signal processor 2 in the horizontal synchronizing period including four continuous periods. Thus, signal processor 2 does need to include a frame buffer which records and retains four different pixel signals, and can perform pipeline processing with line buffers for three or four columns, each of the line buffer retaining pixel signals A0, A1, A2, and A3 corresponding to four columns of pixel sections 100b. For this reason, the imaging apparatus according to Embodiment 3 can start the output of the distance signal in a short time from the end of the last fourth light exposure sequence while it is compact.

Embodiment 4

The imaging apparatus according to Embodiment 4 will now be described. This imaging apparatus includes pixel section 100c, rather than pixel section 100 included in imaging apparatus 1 according to Embodiment 1. In the description below, identical reference signs will be given to components of the imaging apparatus according to Embodiment 3 identical to those of pixel section 100 according to Embodiment 1, and the detailed description thereof will be omitted because those have been already described.

Figure 19:
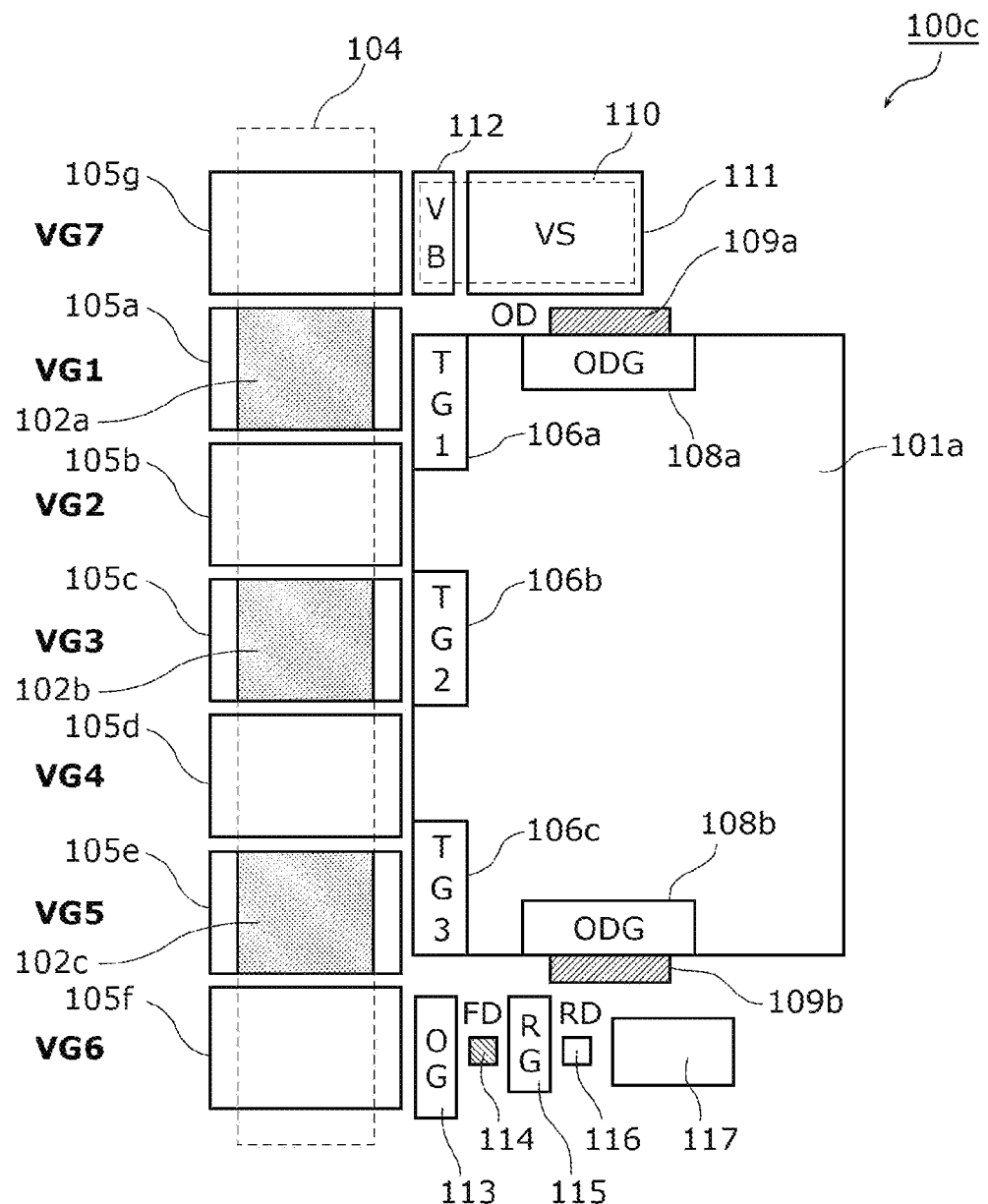
FIG. 19 is a block diagram illustrating an example of the configuration of the pixel section according to Embodiment 4.

FIG. 19 is a schematic view illustrating an example of the configuration of pixel section 100c.

Unlike pixel section 100 according to Embodiment 1 including five transfer electrodes 105 (transfer electrodes 105a, 105b, 105c, 105d, and 105e) (see FIG. 5), pixel section 100c includes seven transfer electrodes 105 (transfer electrodes 105a, 105b, 105c, 105d, 105e, 105f, and 105g) as illustrated in FIG. 19.

In the present embodiment, voltages VG1, VG2, VG3, VG4, VG5, VG6, and VG7 are applied to transfer electrodes 105a, 105b, 105c, 105d, 105e, 105f, and 105g, respectively.

In such a configuration, three separated charge accumulators 102 (here, first charge accumulator 102a, second charge accumulator 102b, and third charge accumulator 102c) can be formed in one pixel section 100c.

First charge accumulator 102a, second charge accumulator 102b, and third charge accumulator 102c are formed below transfer electrodes 105 in the depth directions thereof (here, below transfer electrodes 105a, 105c, and 105e in the depth directions thereof) under high voltages VG1, VG3, and VG5 applied by pixel array controller 11.

As illustrated in FIG. 19, pixel section 100c includes photoelectric converter 101a, rather than photoelectric converter 101 in pixel section 100 according to Embodiment 1.

Unlike pixel section 100 according to Embodiment 1 including two read-out gates 106 (first read-out gate 106a and second read-out gate 106b) (see FIG. 5), photoelectric converter 101a includes three read-out gates 106 (first read-out gate 106a, second read-out gate 106b, and third read-out gate 106c).

First charge accumulator 102a, second charge accumulator 102b, and third charge accumulator 102c are adjacent to first read-out gate 106a, second read-out gate 106b, and third read-out gate 106c, respectively. The signal charge generated in photoelectric converter 101 is accumulated in first charge accumulator 102a, second charge accumulator 102b, and third charge accumulator 102c through first read-out gate 106a, second read-out gate 106b, and third read-out gate 106c in the activated state.

Figure 20:
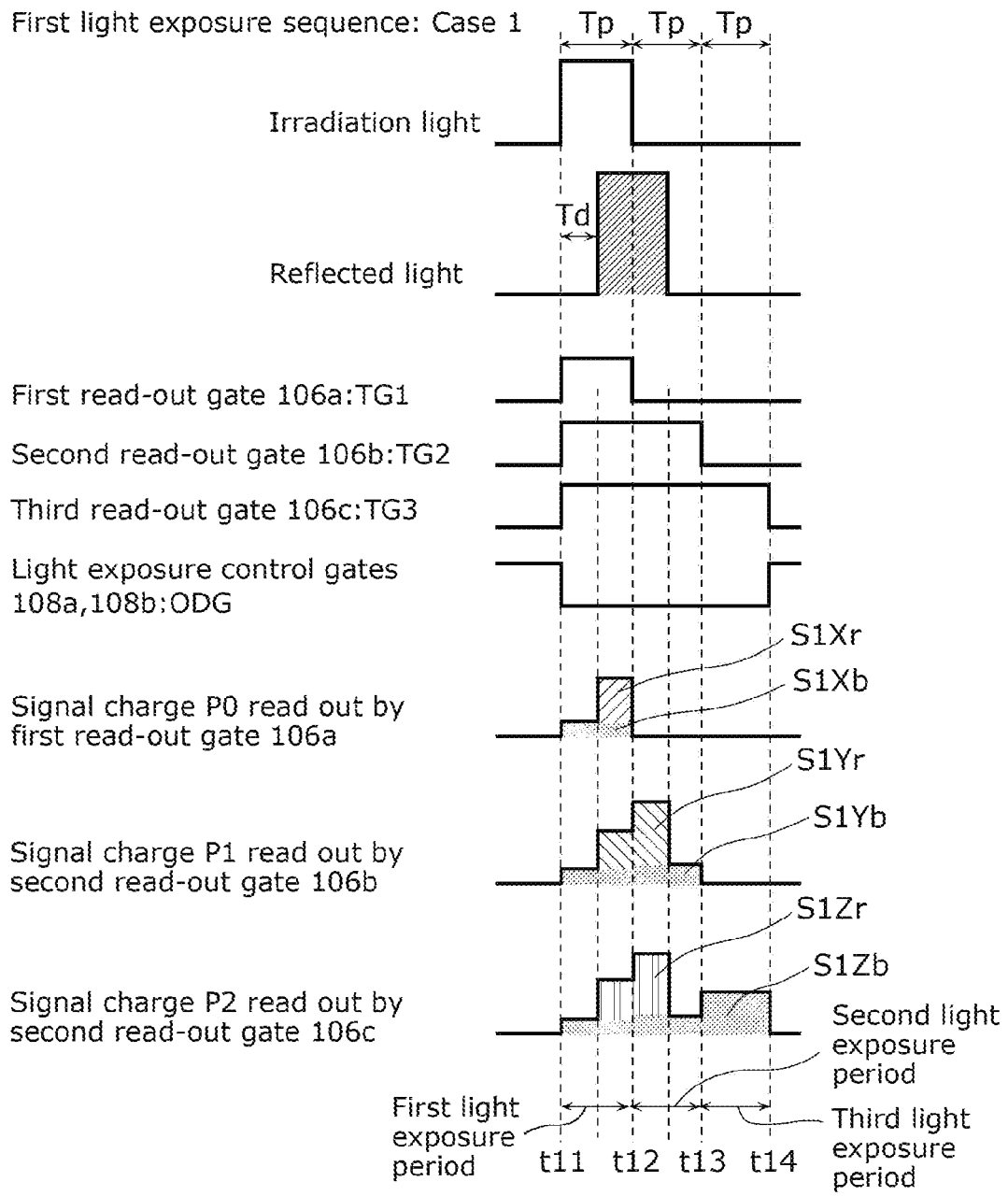
FIG. 20 is a timing chart of a first light exposure sequence according to Embodiment 4.
Figure 21:
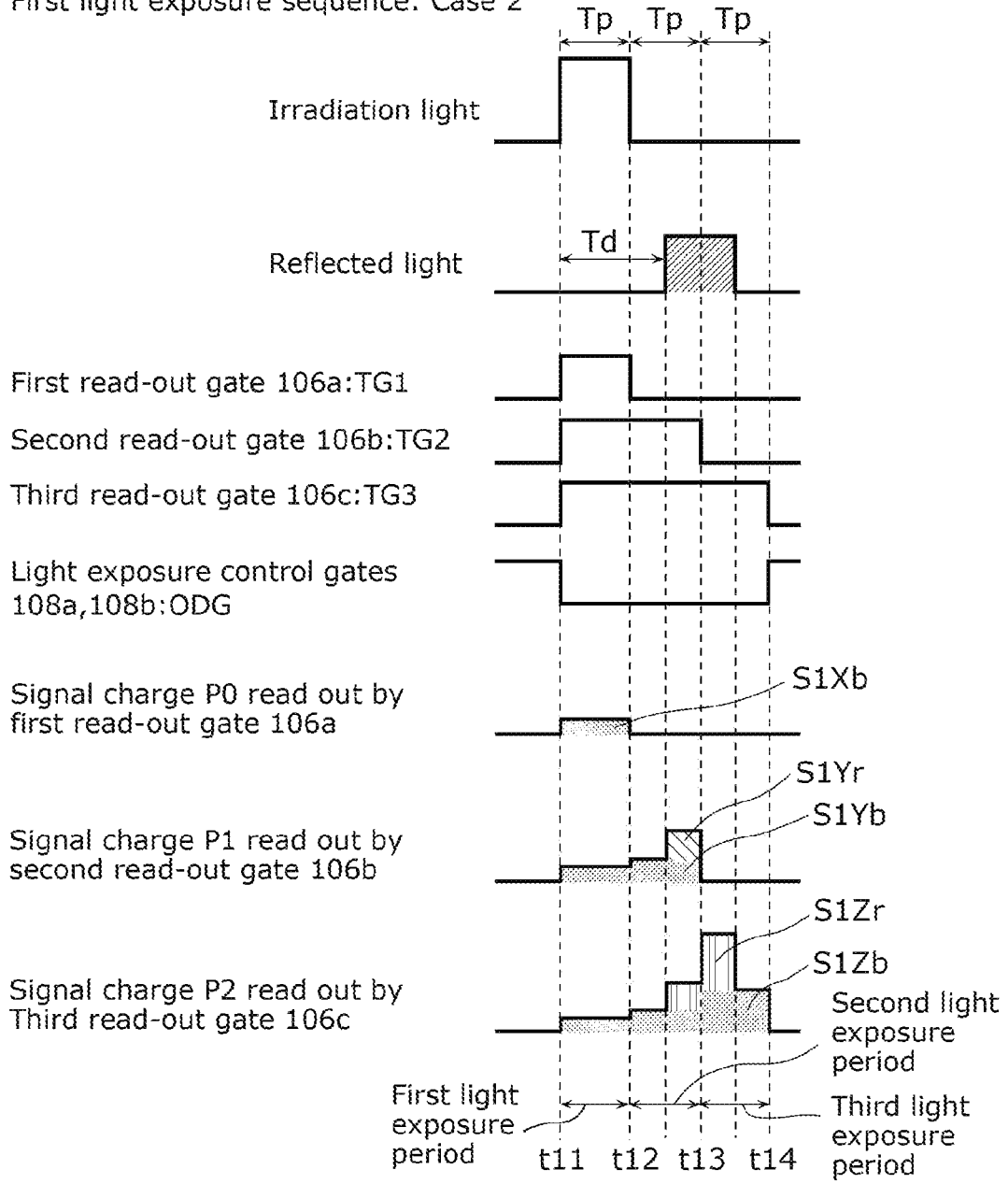
FIG. 21 is a timing chart of the first light exposure sequence according to Embodiment 4.

FIGS. 20 and 21 are each a timing chart of the first light exposure sequence according to Embodiment 4 illustrating the light emission timing of light emitter 4, the light exposure and signal accumulation timing in pixel section 100c, and the light exposure states of the signal charges accumulated in charge accumulators 102 through first read-out gate 106a, second read-out gate 106b, and third read-out gate 106c.

The first light exposure sequence includes a first light exposure period synchronizing with time Tp from the start of irradiation to the end of irradiation with the pulsed light emitted from light emitter 4 having a timing controlled by controller 3, and a second light exposure period until time Tp passes from the end of irradiation with the pulsed light, and a third light exposure period until time Tp passes from the end of the second light exposure period.

After the first light exposure sequence starts, according to an instruction by controller 3, the pulsed light having an interval of time Tp is emitted from light emitter 4. The reflected light of the emitted pulsed light reflected from the subject reaches pixel section 100c after a delay of time Td according to the distance from the imaging apparatus according to Embodiment 4, and is converted to a signal charge in photoelectric converter 101a.

FIG. 20 is a timing chart of case 1 where the pulsed reflected light is received by photoelectric converter 101a in a period across the first light exposure period and the second light exposure period. FIG. 21 is a timing chart of case 2 where the pulsed reflected light is received by photoelectric converter 101a in a period across the second light exposure period and the third light exposure period.

According to an instruction by controller 3, pixel array controller 11 transits ODG from the high state (activated state) to the low state (deactivated state) at time t11 at which the first light exposure period starts, and concurrently transits first read-out gate 106a, second read-out gate 106b, and third read-out gate 106c all from the low state (deactivated state) to the high state (activated state).

By the operation of pixel array controller 11, discharge of the signal charge from photoelectric converter 101a to overflow drain 109 is stopped, and the signal charge generated in photoelectric converter 101a by receiving the reflected light of the pulsed light emitted from light emitter 4 which reaches photoelectric converter 101a in the first light exposure period and by receiving the background light other than the reflected light reaching photoelectric converter 101a in the first light exposure period is accumulated in first charge accumulator 102a through first read-out gate 106a, in second charge accumulator 102b through second read-out gate 106b, and in third charge accumulator 102c through third read-out gate 106c. Thereby, about one-third of the signal charge generated in photoelectric converter 101a is distributed to and accumulated in first charge accumulator 102a, second charge accumulator 102b, and third charge accumulator 102c.

Next, in the second light exposure period, according to an instruction by controller 3, pixel array controller 11 transits first read-out gate 106a from the high state (activated state) to the low state (deactivated state) at time t12 (timing of the start). Thereby, the accumulation of the signal charge in first charge accumulator 102a is stopped.

By the operation of pixel array controller 11, the signal charge generated in photoelectric converter 101 by receiving the reflected light which reaches photoelectric converter 101a in the second light exposure period and by receiving the background light which reaches photoelectric converter 101a in the second light exposure period is accumulated in second charge accumulator 102b through second read-out gate 106b and in third charge accumulator 102c through third read-out gate 106c. Thereby, about a half of the signal charge generated in photoelectric converter 101a is accumulated in second charge accumulator 102b and third charge accumulator 102c.

Next, in the third light exposure period, according to an instruction by controller 3, pixel array controller 11 transits second read-out gate 106b from the high state (activated state) to the low state (deactivated state) at time t13 (timing of the start). Thereby, the accumulation of the signal charge in second charge accumulator 102b is stopped.

By the operation of pixel array controller 11, the signal charge generated in photoelectric converter 101a by receiving the reflected light which reaches photoelectric converter 101a in the third light exposure period and by receiving the background light which reaches photoelectric converter 101a in the third light exposure period is totally accumulated in third charge accumulator 102c through third read-out gate 106c.

At time t14, which is the end of the third light exposure period, according to an instruction by controller 3, pixel array controller 11 stops the accumulation of the signal charge in third charge accumulator 102c by transiting third read-out gate 106c from the high state (activated state) to the low state (deactivated state), and converts light exposure control gate 108 to an electrically conducted state by transiting ODG from the low state (deactivated state) to the high state (activated state). Thereby, photoelectric converter 101 is reset.

Hereinafter, at the end of the first light exposure sequence, the signal charge accumulated in first charge accumulator 102a through first read-out gate 106a is defined as P0, the signal charge accumulated in second charge accumulator 102b through second read-out gate 106b is defined as P1, and the signal charge accumulated in third charge accumulator 102c through third read-out gate 106c is defined as P2.

Signal charges P0, P1, and P2 are output from each pixel section 100c to signal processor 2 by the signal charge reading-out operation as pixel signals P0, P1, and P2 in order of raster scanning, and are retained in signal processor 2.

As illustrated in FIG. 20, in case 1 where the subject is located in a relatively close distance and the reflected light has a relatively large intensity, about one-third of the signal charge generated in photoelectric converter 101a in the first light exposure period is distributed to and accumulated in three charge accumulators 102. Thereby, signal saturation in charge accumulator 102 is further suppressed by the imaging apparatus according to Embodiment 4.

Figure 22:
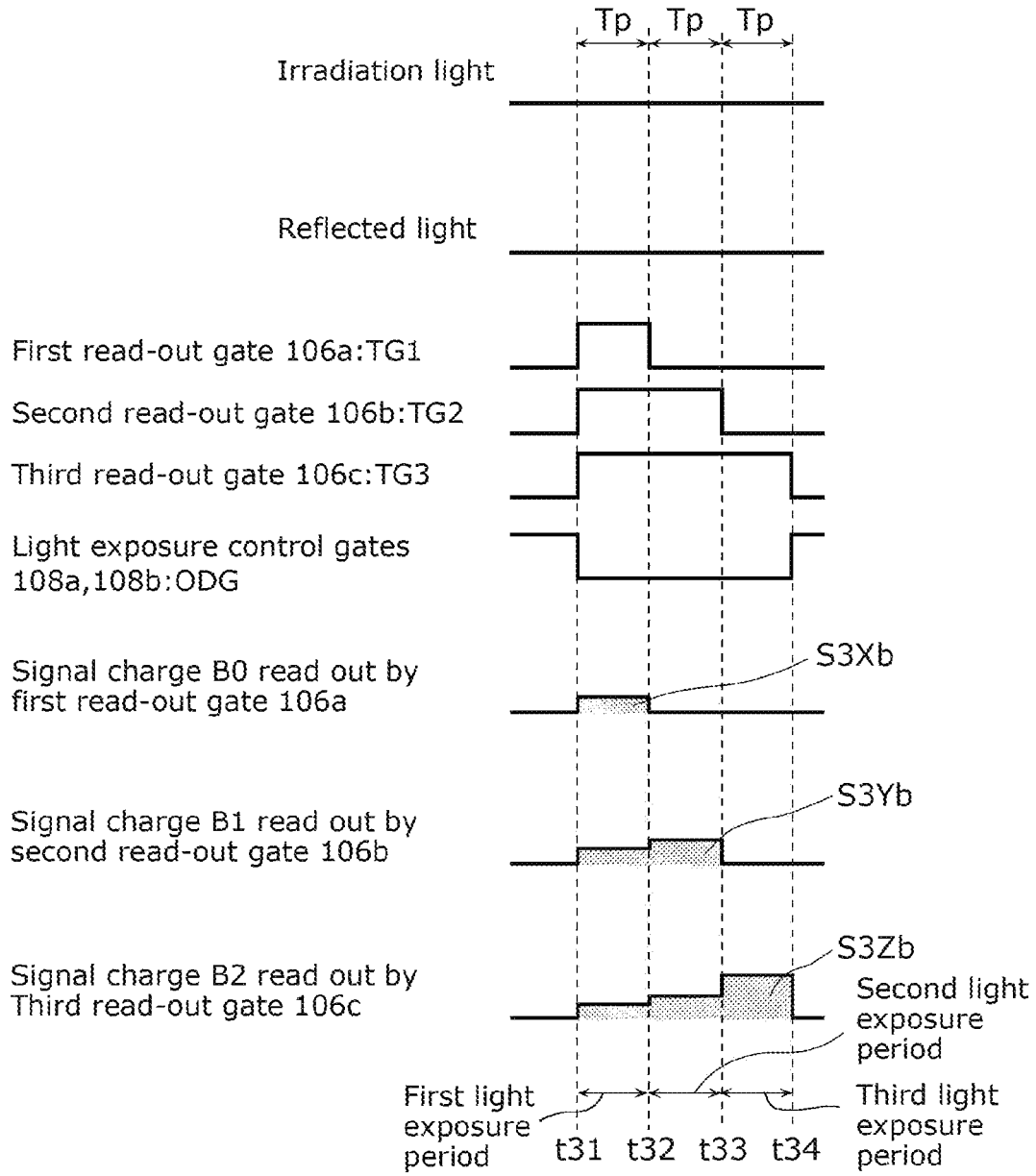
FIG. 22 is a timing chart of a third light exposure sequence according to Embodiment 4.

FIG. 22 is a timing chart of the third light exposure sequence according to Embodiment 4 illustrating the light exposure and signal accumulation timing in pixel section 100c, and the light exposure states of the signal charges accumulated in charge accumulators 102 through first read-out gate 106a, second read-out gate 106b, and third read-out gate 106c.

The third light exposure sequence includes a first light exposure period having the same length as that of time Tp from the start of irradiation to the end with the pulsed light from light emitter 4 in the first light exposure sequence, and a second light exposure period until time Tp passes from the end of the first light exposure period, and a third light exposure period until time Tp passes from the end of the second light exposure period.

In the third light exposure sequence, the pulsed light is not emitted from light emitter 4.

According to an instruction by controller 3, pixel array controller 11 transits ODG from the high state (activated state) to the low state (deactivated state) synchronizing with time t31 at which the first light exposure period starts, and concurrently transits first read-out gate 106a, second read-out gate 106b, and third read-out gate 106c all from the low state (deactivated state) to the high state (activated state).

By the operation of pixel array controller 11, discharge of the signal charge from photoelectric converter 101a to overflow drain 109 is stopped, and the signal charge generated in photoelectric converter 101a by receiving the background light is accumulated in first charge accumulator 102a through first read-out gate 106a, in second charge accumulator 102b through second read-out gate 106b, and in third charge accumulator 102c through third read-out gate 106c. Thereby, about one-third of the signal charge generated in photoelectric converter 101a is distributed to and accumulated in first charge accumulator 102a, second charge accumulator 102b, and third charge accumulator 102c.

Next, in the second light exposure period, according to an instruction by controller 3, pixel array controller 11 transits first read-out gate 106a from the high state (activated state) to the low state (deactivated state) at time t32 (timing of the start). Thereby, the accumulation of the signal charge in first charge accumulator 102a is stopped.

By the operation of pixel array controller 11, the signal charge generated in photoelectric converter 101a by receiving the background light which reaches photoelectric converter 101a in the second light exposure period is accumulated in second charge accumulator 102b through second read-out gate 106b and in third charge accumulator 102c through third read-out gate 106c. Thereby, about a half of the signal charge generated in photoelectric converter 101a is accumulated in second charge accumulator 102b and third charge accumulator 102c.

Next, in the third light exposure period, according to an instruction by controller 3, pixel array controller 11 transits second read-out gate 106b from the high state (activated state) to the low state (deactivated state) at time t33 (timing of the start). Thereby, the accumulation of the signal charge in second charge accumulator 102b is stopped.

By the operation of pixel array controller 11, the signal charge generated in photoelectric converter 101a by receiving the background light which reaches photoelectric converter 101a in the third light exposure period is totally accumulated in third charge accumulator 102c through third read-out gate 106c.

At time t34, which is the end of the third light exposure period, according to an instruction by controller 3, pixel array controller 11 stops the accumulation of the signal charge in third charge accumulator 102c by transiting third read-out gate 106c from the high state (activated state) to the low state (deactivated state), and converts light exposure control gate 108 to an electrically conducted state by transiting ODG from the low state (deactivated state) to the high state (activated state). Thereby, photoelectric converter 101 is reset.

Hereinafter, at the end of the third light exposure sequence, the signal charge accumulated in first charge accumulator 102a through first read-out gate 106a is defined as B0, the signal charge accumulated in second charge accumulator 102b through second read-out gate 106b is defined as B1, and the signal charge accumulated in third charge accumulator 102c through third read-out gate 106c is defined as B2.

Signal charges B0, B1, and B2 are output from each pixel section 100c to signal processor 2 by the signal charge reading-out operation as pixel signals B0, B1, and B2 in order of raster scanning, and are retained in signal processor 2.

Pixel signal B0 is equal to the background light component contained in pixel signal P0 (signal charge S1Xb in FIG. 20 or FIG. 21), pixel signal B1 is equal to the background light component contained in pixel signal P1 (signal charge S1Yb in FIG. 20 or FIG. 21), and pixel signal B2 is equal to the background light component contained in pixel signal P2 (signal charge S1Zb in FIG. 20 or FIG. 21).

Signal processor 2 calculates distance signals Dout corresponding to respective pixel sections 100c from pixel signals P0, P1, and P2 and pixel signals B0, B1, and B2 retained.

As a first procedure, signal processor 2 calculates pixel signal P0c from (Expression 27) where the background light component is removed from pixel signal P0 corresponding to each pixel section 100c, calculates pixel signal P1c from (Expression 28) where the background light component is removed from pixel signal P1, and calculates pixel signal P2c from (Expression 29) where the background light component is removed from pixel signal P2.

$$P0c = P0 - B0 \quad \text{(Expression 27)}$$

$$P1c = P1 - B1 \quad \text{(Expression 28)}$$

$$P2c = P2 - B2 \quad \text{(Expression 29)}$$

As a second procedure, signal processor 2 determines whether the reflected light reflected from the subject when the first light exposure sequence is performed corresponds to case 1 where the charge is accumulated in pixel section 100c within the first light exposure period and the second light exposure period or corresponds to case 2 where the charge is accumulated within the second light exposure period and the third light exposure period, and calculates distance signal Dout.

In the case where the condition represented by (Expression 30) is satisfied, it can be determined that the reflected light is not received in pixel section 100c in the third light exposure period. Thus, distance signal Dout is calculated from (Expression 31):

$$P0c \geq P2c - P1c \quad \text{(Expression 30)}$$

$$Dout = K' \times (P2c + P1c - 2 \times P0c)/(P2c + P1c + P0c) \quad \text{(Expression 31)}$$

In the case where the condition represented by (Expression 32) is satisfied, it can be determined that the reflected light is not received in pixel section 100c in the first light exposure period. Thus, distance signal Dout is calculated from (Expression 33):

$$P0c < P2c - P1c \quad \text{(Expression 32)}$$

$$Dout = K' \times \{1 + (P2c - P1c)/(P2c + P1c)\} \quad \text{(Expression 33)}$$

In (Expression 31) and (Expression 33), K' is a constant corresponding to c×Tp/2.

Apparently from the description about Embodiment 4 above, in the imaging apparatus according to Embodiment 4, the detection limit distance of the subject in a long distance is c×Tp, the detection limit distance being determined in principle by time Tp, which is the pulse width of the irradiation light emitted from light emitter 4. For this reason, the imaging apparatus according to Embodiment 4 can measure the distance twice longer than that measured by imaging apparatus 1 according to Embodiment 1 having a detection limit distance of the subject in a long distance of c×Tp/2.

Although Embodiment 4 does not include the step corresponding to the "signal charge exchange drive" disclosed in Embodiment 1, such a step can be easily implemented by a technique according to the present disclosure (for example, a step similar to the signal charge exchange drive in Embodiment 1) by adding four more transfer electrodes 105 at the maximum in the configuration illustrated in FIG. 19.

Although the imaging apparatus according to one aspect of the present disclosure has been described based on Embodiments 1 to 4, these embodiments should not be construed as limitations to the present disclosure. One or more aspects according to the present disclosure may also cover a variety of modifications of these embodiments conceived and made by persons skilled in the art and combinations of components included in different embodiments without departing from the gist of the present disclosure.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure can be widely used in imaging apparatuses which obtain distance images of subjects.

The invention claimed is:

1. An imaging apparatus, comprising:
a light emitter which emits pulsed light to a subject;
a solid-state imaging device including a pixel section disposed on a semiconductor substrate; and
a signal processor which calculates distance information concerning a distance to the subject,
wherein the pixel section includes:
a photoelectric converter which converts received light to a signal charge;
a first read-out gate and a second read-out gate which read out signal charges from the photoelectric converter; and
a plurality of charge accumulators which includes a first charge accumulator and a second charge accumulator which are paired with the first read-out gate and the second read-out gate, respectively, and accumulates the signal charges read out by the first read-out gate and the second read-out gate,
the first read-out gate is activated in a first period which starts before emission of the pulsed light by the light emitter is stopped, and is deactivated in a second period subsequent to the first period,
a time interval between the start of the first period and an end of the second period is longer than an emission period of the pulsed light,
the second read-out gate is activated in the first period and the second period,
the first charge accumulator accumulates the signal charge read out by the first read-out gate activated in the first period,
the second charge accumulator accumulates the signal charge read out by the second read-out gate activated in the first period and the second period, and
when the photoelectric converter receives light, the signal processor calculates the distance information based on:
a total amount of the signal charges accumulated in the plurality of charge accumulators in the first period and the second period; and
a difference between an amount of the signal charge accumulated in the second charge accumulator in the first period and the second period and an amount of the signal charge accumulated in the first charge accumulator in the first period.

2. The imaging apparatus according to claim 1, wherein a timing for starting activation of the first read-out gate is identical to a timing for starting activation of the second read-out gate.

3. The imaging apparatus according to claim 1, wherein a timing for starting activation of the first read-out gate is earlier than a timing for starting activation of the second read-out gate.

4. The imaging apparatus according to claim 1, wherein the solid-state imaging device includes pixel sections arranged in a matrix to constitute a pixel array, each of the pixel sections being the pixel section, and
in all of the pixel sections,
the first read-out gates and the second read-out gates are disposed in identical relative positions with respect to the photoelectric converter, and
timings of activation and deactivation of the first read-out gates are identical, and timings of activation and deactivation of the second read-out gates are identical.

5. The imaging apparatus according to claim 1, wherein in a first reflected light non-reception period in which the photoelectric converter does not receive reflected light of the pulsed light emitted from the light emitter, the first read-out gate is further activated in a third period having a time interval identical to a time interval of the first period, and is further deactivated in a fourth period which is subsequent to the third period and has a time interval identical to a time interval of the second period,
in the first reflected light non-reception period, the second read-out gate is further activated in the third period and the fourth period,
the first charge accumulator further accumulates the signal charge read out by the first read-out gate which is activated, in the third period,
the second charge accumulator further accumulates the signal charge read out by the second read-out gate which is activated, in the third period and the fourth period, and
the signal processor calculates the distance information based on an amount of the signal charge accumulated in the first charge accumulator in the third period and an amount of the signal charge accumulated in the second charge accumulator in the third period and the fourth period.

6. The imaging apparatus according to claim 1,
wherein the pixel section further includes a signal exchanger for use in exchanging the signal charge accumulated in the first charge accumulator and the signal charge accumulated in the second charge accumulator between the first charge accumulator and the second charge accumulator,
the light emitter further reemits the pulsed light to the subject after exchanging the signal charge accumulated in the first charge accumulator and the signal charge accumulated in the second charge accumulator using the signal exchanger,
the second read-out gate is further activated in a fifth period where a phase difference in the fifth period with respect to reemission of the pulsed light by the light emitter is equal to a phase difference in the first period with respect to the pulsed light by the light emitter, and is further deactivated in a sixth period where a phase difference in the six period with respect to reemission of the pulsed light by the light emitter is equal to a phase difference in the second period with respect to emission of the pulsed light by the light emitter,
the first read-out gate is further activated in the fifth period and the sixth period,
the first charge accumulator further accumulates the signal charge read out by the first read-out gate which is activated, in the fifth period and the sixth period,
the second charge accumulator further accumulates the signal charge read out by the second read-out gate which is activated, in the fifth period, and
when the photoelectric converter further receives light, the signal processor calculates the distance information based on:
a total amount of the signal charges accumulated in the plurality of charge accumulators in the first period, the second period, the fifth period, and the sixth period; and
a difference between a total amount of the signal charges accumulated in the second charge accumulator in the first period and the second period and the signal charges accumulated in the first charge accumulator in the fifth period and the sixth period and a total amount of the signal charge accumulated in the first charge accumulator in the first period and the signal charge accumulated in the second charge accumulator in the fifth period.

7. The imaging apparatus according to claim 6,
wherein in a second reflected light non-reception period in which the photoelectric converter does not receive reflected light of the pulsed light reemitted from the light emitter, the second read-out gate is further activated in a seventh period having a time interval identical to a time interval of the fifth period, and is further deactivated in an eighth period which is subsequent to the seventh period and has a time interval identical to a time interval of the sixth period,
in the second reflected light non-reception period, the first read-out gate is further activated in the seventh period and the eighth period, the first charge accumulator further accumulates the signal charge read out by the first read-out gate which is activated, in the seventh period and the eighth period,
the second charge accumulator further accumulates the signal charge read out by the second read-out gate which is activated, in the seventh period, and
the signal processor calculates the distance information based on an amount of the signal charge accumulated in the first charge accumulator in the seventh period and the eighth period and an amount of the signal charge accumulated in the second charge accumulator in the seventh period.

8. The imaging apparatus according to claim 1,
wherein the plurality of charge accumulators further includes a third charge accumulator and a fourth charge accumulator which are paired with the first read-out gate and the second read-out gate, respectively.

9. A distance information calculation method which is performed by an imaging apparatus including: a light emitter which emits pulsed light to a subject; a solid-state imaging device including a pixel section disposed on a semiconductor substrate; and a signal processor which calculates distance information concerning a distance to the subject, the pixel section including a photoelectric converter which converts received light to a signal charge, a first read-out gate and a second read-out gate which read out signal charges from the photoelectric converter, a plurality of charge accumulators which includes a first charge accumulator and a second charge accumulator which are paired with the first read-out gate and the second read-out gate, respectively, and accumulates the signal charges read out by the first read-out gate and the second read-out gate, the distance information calculation method comprising:
activating the first read-out gate in a first period which starts before emission of the pulsed light by the light emitter is stopped, and deactivating the first read-out gate in a second period subsequent to the first period, where a time interval between the start of the first period and an end of the second period is longer than an emission period of the pulsed light;
activating the second read-out gate in the first period and the second period;
accumulating the signal charge read out by the first read-out gate which is activated, in the first charge accumulator in the first period;
accumulating the signal charge read out by the second read-out gate which is activated, in the second charge accumulator in the first period and the second period; and
calculating the distance information based on:
a total amount of the signal charges accumulated in the plurality of charge accumulators in the first period and the second period, and
a difference between an amount of the signal charge accumulated in the second charge accumulator in the first period and the second period and an amount of the signal charge accumulated in the first charge accumulator in the first period when the photoelectric converter receives light.

* * * * *